(12) United States Patent
Niebur

(10) Patent No.: US 9,310,141 B2
(45) Date of Patent: Apr. 12, 2016

(54) COUNTER CURRENT HEAT EXCHANGE MODULE

(76) Inventor: Gerald William Niebur, Tempe, AZ (US)

(*) Notice: Subject to any disclaimer, the term of this patent is extended or adjusted under 35 U.S.C. 154(b) by 635 days.

(21) Appl. No.: 13/531,459

(22) Filed: Jun. 22, 2012

(65) Prior Publication Data
US 2013/0032318 A1    Feb. 7, 2013

Related U.S. Application Data

(60) Provisional application No. 61/571,142, filed on Jun. 22, 2011.

(51) Int. Cl.
| | | |
|---|---|---|
| *B01F 3/04* | (2006.01) | |
| *F28F 3/04* | (2006.01) | |
| *F28F 25/06* | (2006.01) | |
| *F28F 25/10* | (2006.01) | |
| *F28D 5/00* | (2006.01) | |
| *F28D 9/00* | (2006.01) | |
| *F24F 3/147* | (2006.01) | |

(52) U.S. Cl.
CPC ............. *F28F 3/046* (2013.01); *B01F 3/04021* (2013.01); *B01F 3/04468* (2013.01); *F28D 5/00* (2013.01); *F28D 9/0037* (2013.01); *F28F 25/06* (2013.01); *F28F 25/10* (2013.01); *F24F 3/147* (2013.01)

(58) Field of Classification Search
CPC .... B01F 3/04; B01F 3/04007; B01F 3/04021; B01F 3/0446; B01F 3/04468; F28F 25/00; F28F 25/02; F28F 25/06; F28F 25/10
USPC .................. 261/108, 112.1, 112.2, 152, 153; 165/166; 95/149; 96/243
See application file for complete search history.

(56) References Cited

U.S. PATENT DOCUMENTS 5,242,627 A * 9/1993 Lundin ...................... 261/112.2

* cited by examiner

*Primary Examiner* — Robert A Hopkins
(74) *Attorney, Agent, or Firm* — Aspire IP; Scott J. Hawranek

(57) ABSTRACT

Heat exchange apparatus comprises a plurality of thermally conductive, moisture impervious sheets. Each sheet comprises a plurality of corrugations. The plurality of sheets are disposed in a stack such that each alternate sheet has its corrugations affixed to and disposed at an angle to the corrugations of an adjacent sheet to provide a plurality of separate flow pathways. The plurality of separate flow pathways comprises first predetermined pathways and second predetermined pathways. The stack of sheets have first end portions disposed to provide a first inlets and a first outlets for the first predetermined pathways and second end portions to provide second inlets and second outlets for the second predetermined pathways. The corrugations forming the second predetermined pathways comprise a wettable surface. The first predetermined pathways are adapted for a first fluid flow and the second predetermined pathways are adapted for a countercurrent second fluid flow.

30 Claims, 18 Drawing Sheets

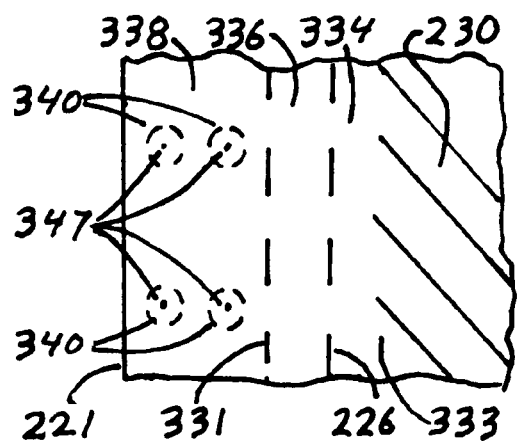
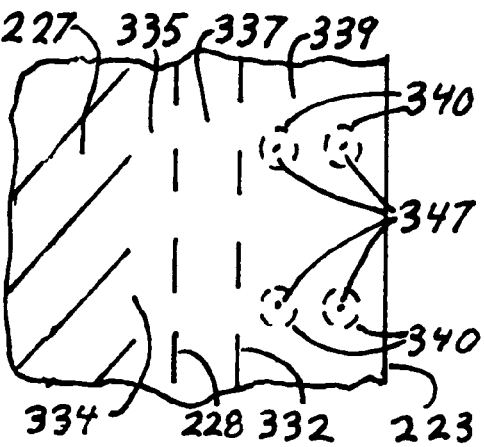
FIG. 3A    FIG. 3B
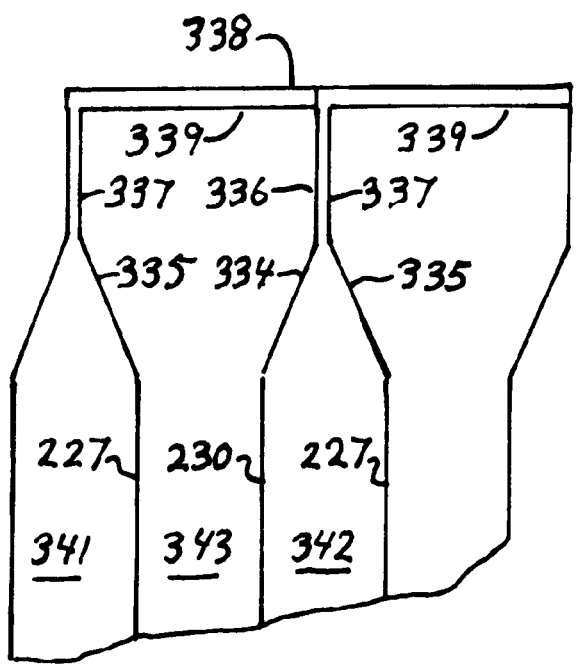
FIG. 3C

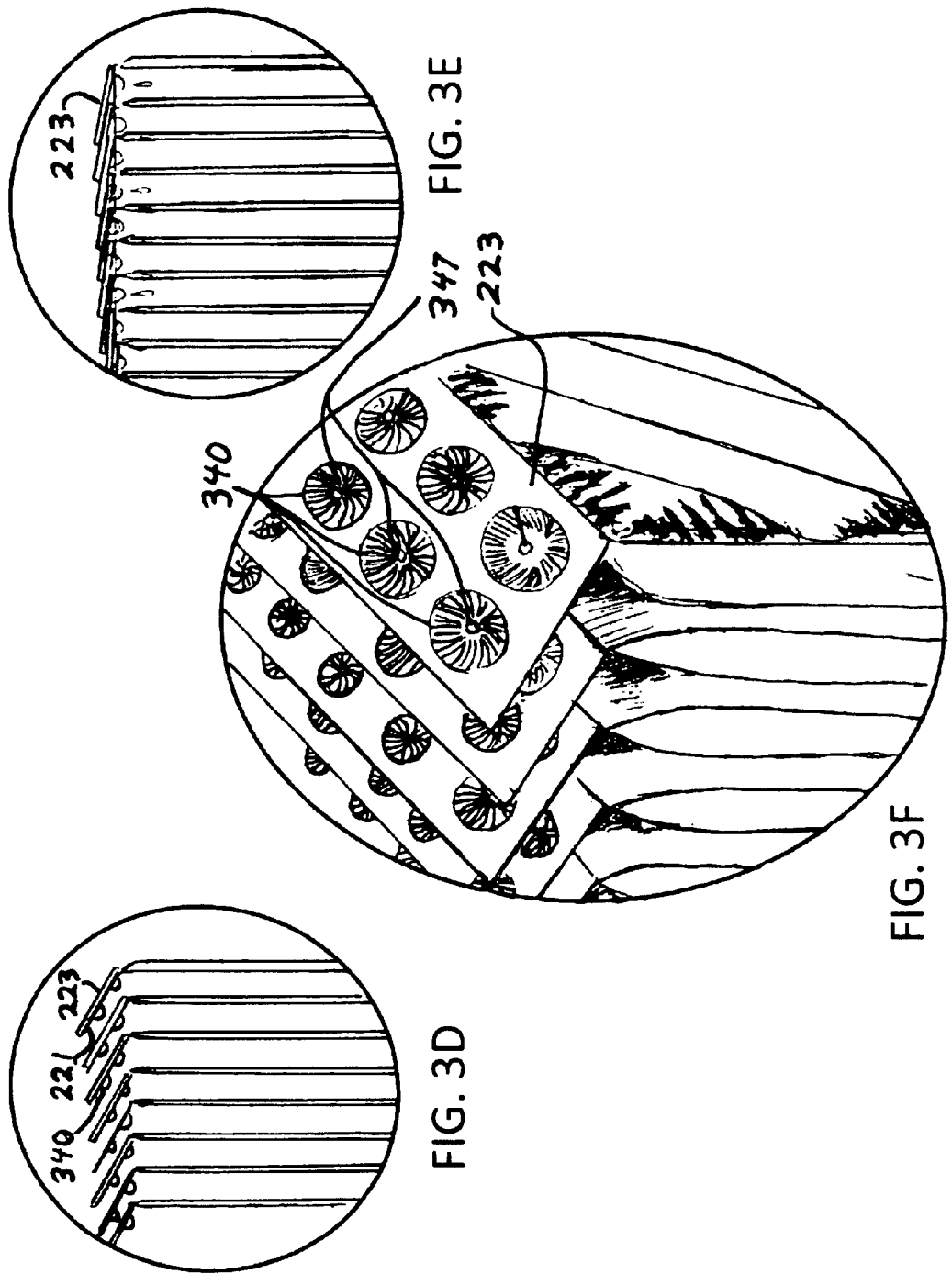

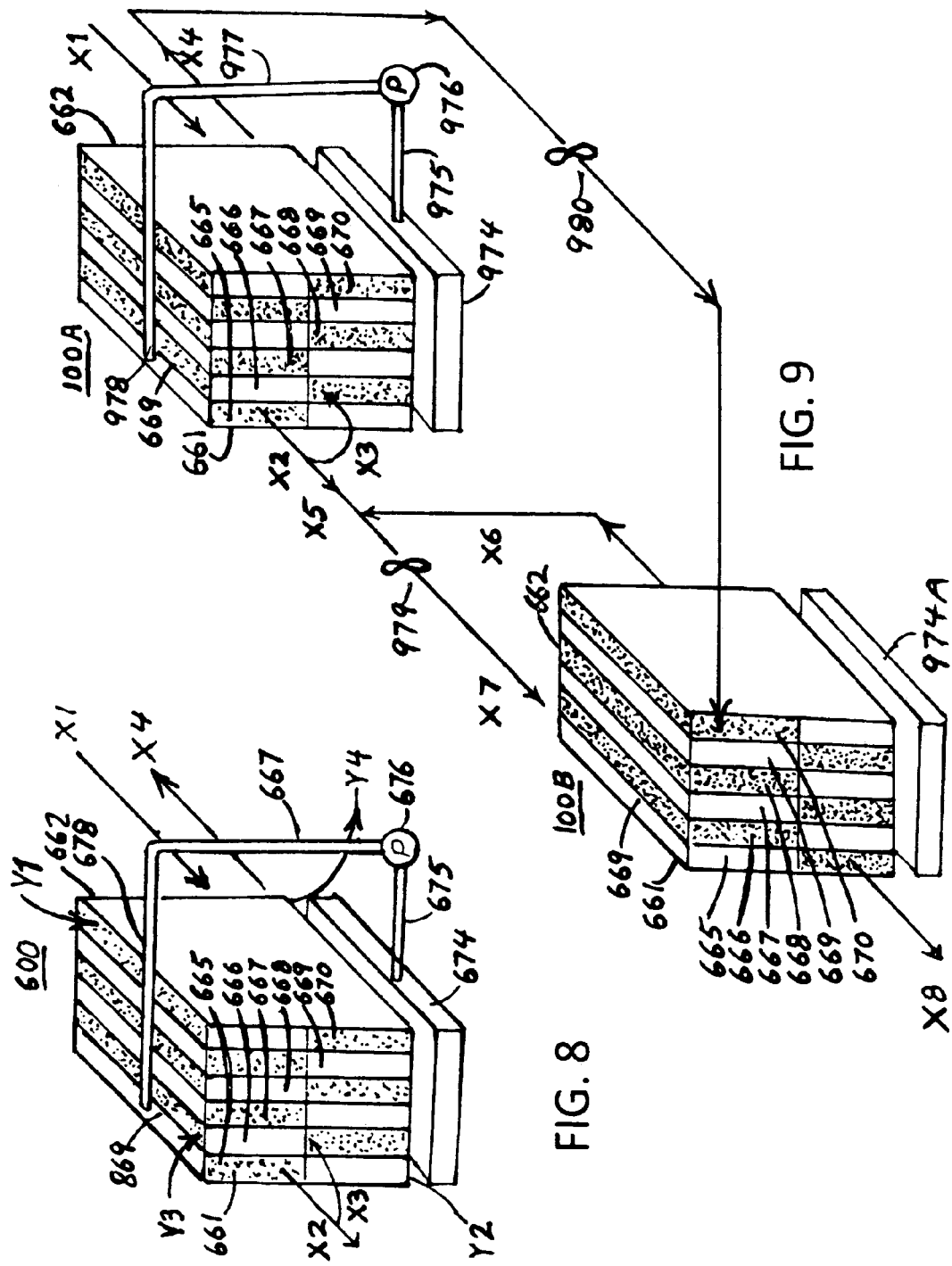

| State Point | Air Flow (cfm) | Dry Bulb (F) | Wet Bulb (F) | Relative Humidity (%) | Humidity Ratio (lb/lb) | Specific Volume (cu.ft./lb) | Enthalpy (Btu/lb) | Dew Point (F) | Density (lb/cu.ft.) | Vapor Pressure (in./Hg) | Absolute Humidity (gr/cu.ft.) |
|---|---|---|---|---|---|---|---|---|---|---|---|
| X1 | 1000 | 95. | 75. | 39.8 | 0.014 | 14.6 | 38.4 | 66.8 | 0.07 | 0.662 | 6.9 |
| X2 | 1000 | 72. | 68.4 | 83.4 | 0.014 | 13.7 | 32.7 | 66.7 | 0.07 | 0.661 | 7.2 |
| X3 | 290 | 72. | 68.4 | 83.4 | 0.014 | 13.7 | 32.7 | 66.7 | 0.07 | 0.661 | 7.2 |
| X4 | 290 | 90. | 87.3 | 90. | 0.028 | 14.5 | 52.4 | 86.7 | 0.07 | 1.281 | 13.5 |

Barometric Pressure: 29921 in. Hg
Atmospheric Pressure 14.696 psi

FIG. 8B

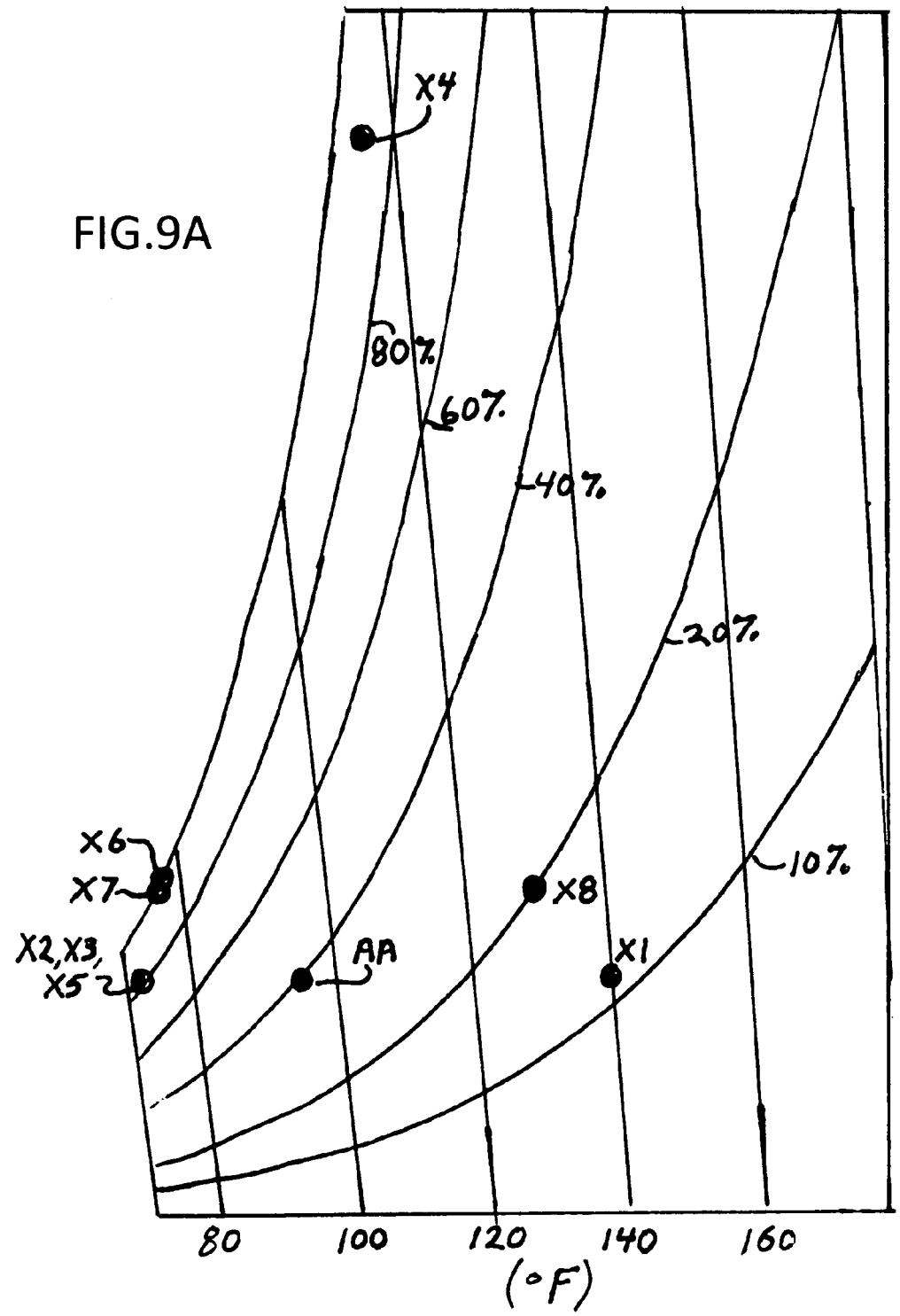

| State Point | Air Flow (cfm) | Dry Bulb (F) | Wet Bulb (F) | Relative Humidity (%) | Humidity Ratio (lb/lb) | Specific Volume (cu.ft./lb) | Enthalpy (Btu/lb) | Dew Point (F) | Density (lb/cu.ft.) | Vapor Pressure (in./Hg) | Absolute Humidity (gr/cu.ft.) |
|---|---|---|---|---|---|---|---|---|---|---|---|
| AA | 1000 | 95. | 75. | 39.8 | 0.014 | 14.6 | 38.4 | 66.8 | 0.07 | 0.662 | 6.4 |
| X1 | 1000 | 140. | 85.6 | 11.2 | 0.014 | 15.5 | 49.4 | 66.8 | 0.06 | 0.662 | 6.4 |
| X2 | 1000 | 72. | 68.4 | 83.4 | 0.014 | 13.7 | 32.7 | 66.7 | 0.07 | 0.661 | 7.2 |
| X3 | 130 | 72. | 68.4 | 83.4 | 0.014 | 13.7 | 32.7 | 66.7 | 0.07 | 0.661 | 7.2 |
| X4 | 130 | 135. | 131.3 | 90. | 0.115 | 17.8 | 161.7 | 131. | 0.06 | 4.655 | 45.5 |
| X5 | 870 | 72. | 68.4 | 83.4 | 0.014 | 13.7 | 32.7 | 66.7 | 0.07 | 0.661 | 7.2 |
| X6 | 130 | 77. | 77. | 100. | 0.020 | 13.9 | 40.6 | 77. | 0.07 | 0.936 | 10.1 |
| X7 | 1000 | 76.5 | 76. | 97.8 | 0.019 | 13.9 | 39.6 | 75.9 | 0.07 | 0.899 | 9.7 |
| X8 | 1000 | 130. | 88.2 | 19.9 | 0.019 | 15.3 | 52.9 | 75.8 | 0.07 | 0.901 | 8.9 |

Barometric Pressure: 29921 in. Hg
Atmospheric Pressure 14.696 psi

FIG. 9B

| State Point | Air Flow (cfm) | Dry Bulb (F) | Wet Bulb (F) | Relative Humidity (%) | Humidity Ratio (lb/lb) | Specific Volume (cu.ft./lb) | Enthalpy (Btu/lb) | Dew Point (F) | Density (lb/cu.ft.) | Vapor Pressure (in./Hg) | Absolute Humidity (gr/cu.ft.) |
|---|---|---|---|---|---|---|---|---|---|---|---|
| X1 | 1000 | 95. | 75. | 39.8 | 0.014 | 14.3 | 38.4 | 66.8 | 0.07 | 0.662 | 6.9 |
| X2 | 1000 | 72. | 68.4 | 83.4 | 0.014 | 13.7 | 32.7 | 66.7 | 0.07 | 0.661 | 7.2 |
| X3 | 290 | 72. | 68.4 | 83.4 | 0.014 | 13.7 | 32.7 | 66.7 | 0.07 | 0.661 | 7.2 |
| X4 | 290 | 90. | 87.3 | 90. | 0.028 | 14.5 | 52.4 | 86.7 | 0.07 | 1.281 | 13.5 |
| X5 | 710 | 72. | 68.4 | 83.4 | 0.014 | 13.7 | 32.7 | 66.7 | 0.07 | 0.661 | 7.2 |
| X6 | 710 | 85. | 60. | 21. | 0.005 | 14.0 | 26.3 | 40.7 | 0.07 | 0.255 | 2.7 |
| X7 | 710 | 55. | 47.7 | 58.4 | 0.005 | 13.1 | 19. | 40.7 | 0.07 | 0.255 | 2.7 |
| X8 | 262 | 55. | 47.7 | 58.4 | 0.005 | 13.1 | 19. | 40.7 | 0.07 | 0.255 | 2.7 |
| X9 | 262 | 80. | 77.6 | 90. | 0.020 | 14.0 | 41.2 | 76.8 | 0.07 | 0.930 | 10.0 |
| X10 | | 80 | 67. | 51.1 | 0.011 | 13.8 | 31.5 | 60.3 | 0.07 | 0.528 | 5.7 |
| X11 | | 77 | 74.7 | 90. | 0.018 | 13.9 | 38.3 | 73.8 | 0.07 | 0.842 | 9.1 |

Barometric Pressure: 29921 in. Hg
Atmospheric Pressure 14.696 psi

FIG. 10B

| State Point | Air Flow (cfm) | Dry Bulb (F) | Wet Bulb (F) | Relative Humidity (%) | Humidity Ratio (lb/lb) | Specific Volume (cu.ft./lb) | Enthalpy (Btu/lb) | Dew Point (F) | Density (lb/cu.ft.) | Vapor Pressure (in./Hg) | Absolute Humidity (gr/cu.ft.) |
|---|---|---|---|---|---|---|---|---|---|---|---|
| X1 | 1000 | 95. | 75. | 39.8 | 0.014 | 14.6 | 38.4 | 66.8 | 0.07 | 0.662 | 6.9 |
| X2 | 1000 | 85. | 60. | 21. | 0.005 | 13.8 | 26.3 | 40.7 | 0.07 | 0.255 | 2.7 |
| X3 | 1000 | 80. | 67. | 51.1 | 0.011 | 13.8 | 31.5 | 60.3 | 0.07 | 0.528 | 5.7 |
| X4 | 1000 | 90. | 87. | 90. | 0.028 | 14.5 | 52. | 86. | 0.07 | 1.262 | 13.3 |

Barometric Pressure: 29.921 in. Hg
Atmospheric Pressure 14.696 psi

FIG. 12B

COUNTER CURRENT HEAT EXCHANGE MODULE

RELATED APPLICATIONS

This application claims priority from U.S. Patent Application 61/571,142 filed on Jun. 22, 2011.

FIELD

The present invention relates to a countercurrent heat exchange apparatus, in general, and to apparatus having two separate pathways suitable for different combinations of dry gases, wetted gases, and liquid flows such that different combinations have or develop different heat and mass configurations in the separate pathways which thermally interact but do not undergo mass transfer, in particular.

BACKGROUND

Adiabatically changing conditions of an air stream are well known, the most common being operation of evaporative coolers wherein the temperature of an air stream is reduced by the evaporation of water. Evaporative coolers generally achieve less than ninety percent saturation of an air stream.

U.S. Pat. No. 5,718,848 offers improvements by employing multi-stages by passing air across a series of spaced parallel wetted wicks that repeatedly interrupt the air passage. As the temperature reduction is proportional to the increase in humidity of an air stream these devices can create excessive humidity in an air stream and this has led to indirectly cooling the primary air stream; a device often referred to as an indirect evaporative cooler. This also follows in the invention just mentioned wherein one air stream is cooled by heat transfer from a second air stream that is maintained nearly saturated with the air streams passing in cross flow.

A counter-flow device of the same basic operation is taught in U.S. Pat. No. 6,845,629 B1.

A cooler air delivery temperature is postulated in U.S. Pat. No. 7,093,452 B2 and U.S. Pat. No. 7,181,918 wherein a portion of the delivery air is returned to the wetted side of the indirect cooler.

A more sophisticated approach is taught in U.S. Pat. Nos. 4,977,753 and 7,197,887 where a portion of the supply air exits while being humidified in a cross flow and staged manner so as to approximate counter flow of the air streams. It is claimed that this configuration allows the final primary air stream to achieve conditions concurrent near the dew point temperature of the beginning air stream.

True counter flow of air streams wherein a portion of a primary air stream is saturated and returned parallel to the primary air stream is taught in a number of patents. For examples, U.S. Pat. No. 6,338,258 B1 incorporates fins to improve heat transfer while U.S. Pat. No. 6,845,629 B1 employs a common basin below the media where water is pumped to alternate chambers in a vertical arrangement. The patents behind these configurations also teach achieving near dew point temperatures of the beginning air stream.

Alternative structures are also presented. U.S. Pat. No. 7,228,891 B2 presents a ventilating system that includes a plurality of laminated plates formed in a mesh type to increase air turbulence in its cross flow configuration. U.S. Pat. No. 6,032,730 teaches forming a counter-flow heat exchanger paper members all having a moisture permeability including a plate-like partition interposed between aligned corrugated sheets.

SUMMARY

Heat exchange apparatus in one embodiment comprises a plurality of thermally conductive, moisture impervious sheets. Each sheet has a corrugated portion comprising a plurality of corrugations. The plurality of sheets are disposed in a stack such that each alternate sheet has its corrugations affixed to and disposed at an angle to the corrugations of an adjacent sheet to provide a plurality of separate flow pathways. The plurality of separate flow pathways comprises first predetermined pathways and second predetermined pathways. The stack of sheets have first end portions disposed to provide a first inlets and a first outlets for the first predetermined pathways and second end portions to provide second inlets and second outlets for the second predetermined pathways. The corrugations forming the second predetermined pathways comprise a wettable surface. The first predetermined pathways are adapted for a first gas flow and the second predetermined pathways are adapted for a second gas flow. The first and second gas flows are countercurrent. The corrugations provide heat transfer between the first and second gas flows such that a temperature change in one of the first and second gas flows causes heat transfer to the other of the first and second gas flows.

In one embodiment, corrugations forming the first predetermined pathways comprise a wettable surface.

In another embodiment, the corrugations forming the second predetermined pathways comprise a wettable surface.

In various embodiments, first fluid distribution apparatus provides first wetting fluid to the first predetermined pathways.

In other embodiments second fluid distribution apparatus provides second wetting fluid to the second predetermined pathways.

The first wetting fluid is a first composition and the second wetting fluid is a second composition, the first composition being different from the second composition.

In one embodiment, the first wetting fluid is water and the second wetting fluid is a liquid desiccant.

In another embodiment, the first wetting fluid is water and the second wetting fluid is a water alcohol solution.

A heat exchange apparatus in one embodiment comprises a plurality of thermally conductive sheets. Each sheet has a first wettable surface and a second moisture impervious surface. Each said sheet has a corrugated portion comprising a plurality of corrugations. The plurality of sheets are disposed in a stack such that each alternate sheet has its corrugations affixed to and disposed at an angle to the corrugations of an adjacent sheet such that the corrugated portions provide a plurality of separate pathways. The plurality of sheets is arranged such that the moisture impervious surface of each sheet faces the moisture impervious surface of the adjacent sheet and the wettable surface of each sheet faces the wettable surface of an adjacent sheet such that first predetermined pathways comprise moisture impervious surfaces and the second predetermined pathways comprise wettable surfaces. The stack of sheets has first end portions disposed to provide first inlets and first outlets for the first predetermined pathways and second end portions to provide second inlets and second outlets for the second predetermined pathways. The first predetermined pathways are adapted for a first gas flow and the second predetermined pathways are adapted for a second gas flow, the first and second gas flows are countercurrent. The corrugations provide heat transfer between the first and second gas flows such that a temperature change in one of the first and second gas flows causes heat transfer to the other of the first and second gas flows.

In a further embodiment, the first gas flow and the second gas flow in the same direction through the heat exchange apparatus.

In various embodiments, the apparatus is configured such that a portion of gas flowing through the first predetermined pathways is channeled countercurrent through the second predetermined pathways.

Each sheet of the plurality of sheets comprises an edge portion usable to aid distribution of fluid when wetting the second predetermined pathway surfaces.

The various embodiments comprise fluid distribution apparatus to provide fluid to the wettable surface.

Various embodiments comprise a reservoir for collecting condensate from gas flowing in the plurality of separate pathways. The fluid distribution apparatus utilizes the condensate as the fluid.

In certain embodiments, apparatus for heat and mass exchange comprises a plurality of modules. Each module comprises a plurality of thermally conductive sheets. Each sheet has a first wettable surface and a second moisture impervious surface. Each said sheet has a corrugated portion comprising a plurality of corrugations. The plurality of sheets are disposed in a stack such that each alternate sheet has its corrugations affixed to and disposed at an angle to the corrugations of an adjacent sheet such that the corrugated portions provide a plurality of separate pathways. The plurality of sheets is arranged such that the moisture impervious surface of each sheet faces the moisture impervious surface of the adjacent sheet and the wettable surface of each sheet faces the wettable surface of an adjacent sheet such that first predetermined pathways comprise moisture impervious surfaces and the second predetermined pathways comprise wettable surfaces. The stack of sheets has first end portions disposed to provide first inlets and first outlets for the first predetermined pathways and second end portions to provide second inlets and second outlets for the second predetermined pathways. The first predetermined pathways are adapted for a first gas flow and the second predetermined pathways are adapted for a second gas flow, the first and second gas flows are countercurrent. The corrugations provide heat transfer between the first and second gas flows such that a temperature change in one of the first and second gas flows causes heat transfer to the other of the first and second gas flows.

In the various embodiments, the corrugations are configured to cause a reduction in both laminar flow and boundary layer thickness of gases flowing through each module.

In certain embodiments, apparatus for heat and mass exchange comprises a plurality of modules. Each module comprises a plurality of thermally conductive, moisture impervious sheets. Each sheet has a corrugated portion comprising a plurality of corrugations. The plurality of sheets are disposed in a stack such that each alternate sheet has its corrugations affixed to and disposed at an angle to the corrugations of an adjacent sheet to provide a plurality of separate flow pathways. The plurality of separate flow pathways comprises first predetermined pathways and second predetermined pathways. The stack of sheets have first end portions disposed to provide a first inlets and a first outlets for the first predetermined pathways and second end portions to provide second inlets and second outlets for the second predetermined pathways. The corrugations forming the second predetermined pathways comprise a wettable surface. The first predetermined pathways are adapted for a first gas flow and the second predetermined pathways are adapted for a second gas flow. The first and second gas flows are countercurrent. The corrugations provide heat transfer between the first and second gas flows such that a temperature change in one of the first and second gas flows causes heat transfer to the other of the first and second gas flows.

BRIEF DESCRIPTION OF THE DRAWINGS

FIG. 3A and FIG. 3B illustrate portions of media sheets utilized in the embodiment of FIG. 1;

FIG. 3C illustrates a portion of the media embodiment of FIG. 1;

FIGS. 3D, 3E and 3F illustrate in greater detail portions of the embodiment of FIG. 1;

FIG. 8 is an isometric and schematic representation of a second system embodiment;

FIG. 8B is a state point table corresponding to the psychrometric chart of FIG. 8A;

FIG. 9 is an isometric and schematic representation of a third system embodiment;

FIG. 9A is a psychrometric chart of the third system embodiment;

FIG. 9B is a state point table corresponding to the psychrometric chart of FIG. 9A;

FIG. 10B is a state point table corresponding to the psychrometric chart of FIG. 10A;

FIG. 12B is a state point table corresponding to the psychrometric chart of FIG. 12A.

DETAILED DESCRIPTION

Figure 1:
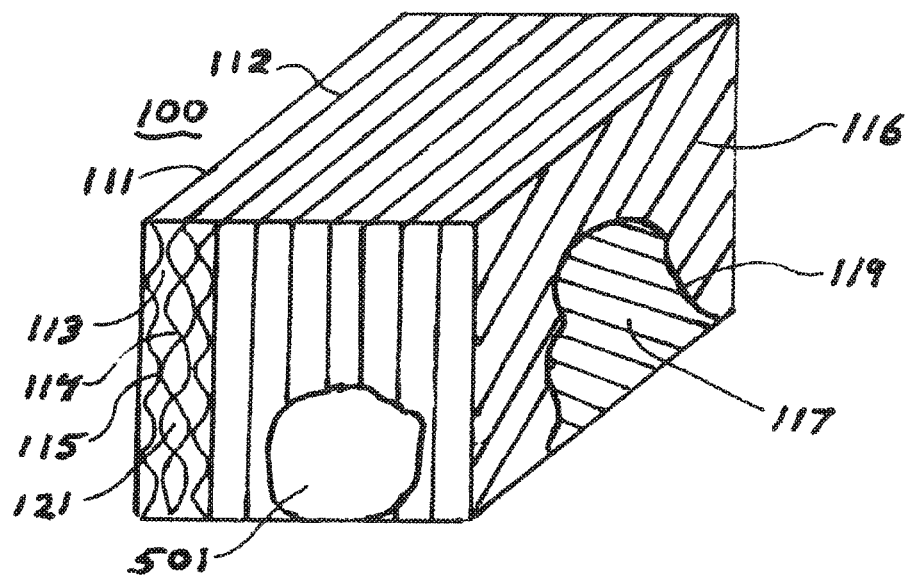
FIG. 1 is a three dimensional perspective and schematic representation of a media module embodiment.

The present invention employs a counter current flow of air streams. Heat transfer between two gas streams is forced by altering the condition of the secondary gas stream, generally by its saturation. Most often a portion of the primary airflow is directed to alternate chambers that are in heat transfer with the primary gas flow.

Apparatus of the embodiments is self-supporting.

Mass transfer between alternate channels is eliminated by affixing an impermeable sheet to one side of the evaporative cooler media. This can be as simple as the waxed paper based sheets commonly known as "butchers' paper" or may be laminated layers consisting of Kraft paper and thin plastic film, for example. This is in contrast with metal or other highly rigid plate structures required by the prior art.

Corrugations within the paper that provide strength when combined with affixing to alternate sheets with the corrugations at different angles offers an uncomplicated procedure for minimizing laminar flow and reducing boundary layer thickness between the air streams and the heat transfer material. In contrast, prior art tube or channel arrangements related to counter-current generally constricts at least one airflow.

Inlets and outlets for primary and secondary air streams may be formed within the paper structure thus providing an internal arrangement that is inexpensive, not subject to thermal separations, and easily be changed in size.

An embodiment of a module accepts a duality of wetting means. In contrast prior art arrangements provide for water evaporation only.

In the various embodiments, economic use of large surface areas provides for close approaches of temperatures nearing reversible conditions.

The module of the embodiments provides a true counter-flow structure. In contrast, prior art structures are cross flow variants that have a known theoretical limit of efficiency.

A module is provided that can be a stand-alone unit or may be combined with additional modules to provide more robust functions. The simplest application is to transfer heat from one air stream to a second air stream in a counter-flow configuration. Theoretical maximum heat exchange between the two air streams could be approached.

A more complex embodiment involves wetting one air stream while providing thermal access to the other air stream. As is known, if an unsaturated airstream with an initial set of thermodynamic conditions is adiabatically exposed to water it will move towards a new thermodynamic equilibrium with both the initial set of conditions and with a second set of thermodynamic conditions found along a specific wet bulb line on a psychometric chart. Under the new thermodynamic equilibrium, the heat transfer potential between the two air streams, one remaining dry and the other wet, is increased by the internally available liquid available for evaporation.

The two air streams may be derived from a single air stream. For instance, a dry air stream flowing counter current to a wetted portion of its own initial flow volume. Assuming ideal heat transfer and ideal humidification of the counter flow airstream, the flow volume of the initial air stream can be split such that the two output streams will separately experience change in temperature and moisture loading that exceed changes normally experienced in a single wetted stream.

To the extent that the conditions can approach ideal (thermodynamically reversible) performance a subset of the second application is in reversing the flows to produce liquid condensation instead of evaporation.

Combinations of the modules may be employed. This can include, for example, one module employed for evaporation of water into an air stream and a second utilized for condensation of water from this air stream.

A compound application of the invention within a single module is wetting both sides of the wall but from different fluid sources such that one gas stream experiences evaporation while the other simultaneously experiences condensation (or absorption).

FIG. 1 illustrates a media block 100. Media block 100 is of a type suitable for use in evaporative coolers. Media block 100 is configured with a plurality of channels. The channels are structured to prevent liquids from passing through, resulting in a segregation of channels. This segregation additionally allows alternate flows of air or another gas in alternate channels to be utilized with one flow not subject to mass transfer.

In contrast, prior art evaporative coolers are structured such that all media surfaces are wetted.

Media block 100 is configured as a typical evaporative cooler pad wherein corrugated plates or sheets 111 and 112 interface with each other. Side 113 of each sheet 111 and side 114 of each adjacent sheet 112 are bonded at the topmost locations of the plates relative to each other, for example at location 115. The bonding is carried out for all plates or sheets 111, 112 of media block 100 to form a robust and self-supporting structure.

The slope of the channels within media block 100 may be the same in alternate channels 116 and 117 with 117 shown in cutaway portion 119 or they may be of alternative angles meaning that the angle in one channel may be different to that of the adjacent channel, a structure followed throughout media block 10.

One side or surface 113, 114 of each sheet 111, 112, is made impervious to passing liquid though the plate. In assembly the impervious sides or surfaces 113, 114 of adjacent sheets 111, 112 face each other so as to construct channels 121 that can contain liquids.

Sheets 111, 112 of media block 100 are each fabricated from a form of Kraft paper as is conventional for evaporative coolers or Kraft paper that is modified by the addition of other materials such as glass fiber in order to improve its flame resistance and extend its upward operational temperature range and chemical tolerance. Alternatively, sheets 111, 112 of media block 100 may be constructed from various plastics such as polypropylene, for example, which may be sheet or of a spun configuration. By utilizing a flexible material, media block 100 may be compressed for ease of shipment or storage.

One side 113, 114 of each sheet 111, 112 is made impermeable by affixing a thin plastic film layer, or by spraying a layer onto the surfaces 113, 114 of sheets 111, 112 a thin liquid proof coating.

In certain and limited cases the heat transfer coefficient of the paper or plastic sheets 111, 1112 may limit process effectiveness and thin metal sheets or carbon composites may prove advantageous.

Figure 2:
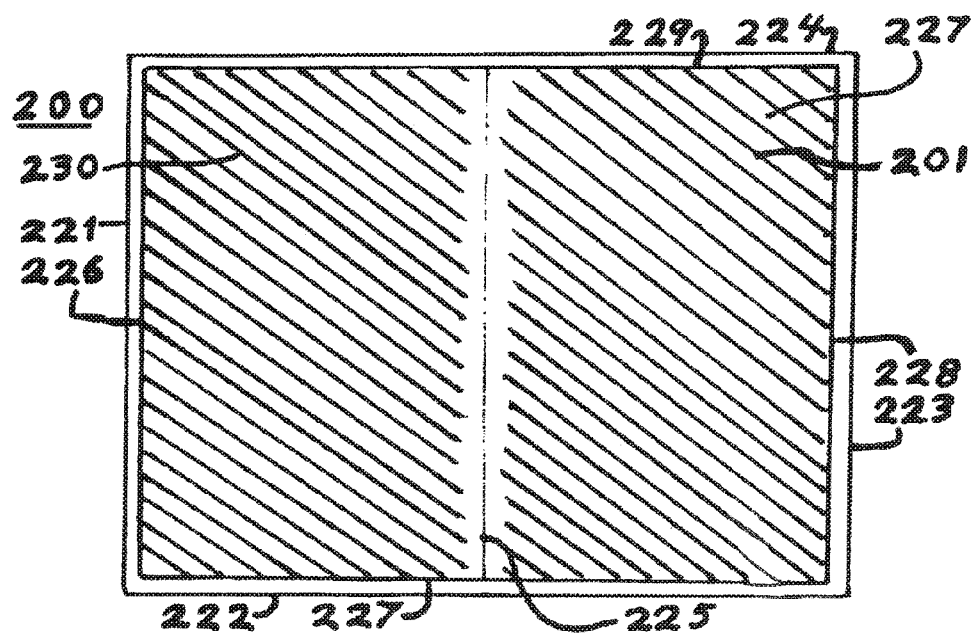
FIG. 2 is a plan view of a platen utilized to form media utilized in the embodiment of FIG. 1.

FIG. 2 illustrates impressions constructed into one side of a platen 200, utilized to form the specialized media sheets 111, 112 utilized in the various embodiments. Although platen 200 is shown as a flat plate for purposes of clarity, in actual and general practice for making evaporative cooler media, platen 200 may be carried on or formed as a cylinder with a matching cylinder holding a reversed patterned platen 200. The cylinders carrying platens 200 rotate while media sheets are fed between platens 200 carried on the cylinders.

Platen 200 carries media borders 221, 222, 223, and 224. A center line 225 is established that forms the basis for bending a media sheet 201 in half to form both sides 111, 112 of a channel, as shown in FIG. 1 while providing a liquid type seal. Media channels 121 as shown in FIG. 1 are formed by a pattern of arcuate portions 226, 230 formed in platen 200. Arcuate portions 226, 230 are separated from adjacent arcuate portions 226, 230 by arcuate ridges 227. Arcuate portions 230 are affixed to arcuate portions 227 after folding media sheet 207 along line 225. The affixation may be by any one of many types known in the art, including, but not limited to many forms of glue both thermal and quickset or by double sided tape, for examples.

The outside perimeter portions 221, 222, 223, 224 of platen 20 are void of ridges 227 thus allowing air movement spaces or sealing to be established in the spaces created between perimeter portion 221 and arcuate fold portion 226, perimeter portion 222 and arcuate portion 227, perimeter portion 223 and arcuate portion 228, and perimeter portion 224 and arcuate fold portion 229.

In other embodiments, separate media sheets omitting the centerfold may be made and the sheets are then bonded in a traditional manner of creating traditional evaporative media.

FIG. 3A illustrates in greater detail a portion of sheet 201 directed to the portions defined by perimeter portion 221 and fold portion 226. FIG. 3B illustrates in greater detail a portion of sheet 201 directed to the portions defined by perimeter portion 223 and fold portion 228. Next to ridges 230, there is space 334 between the termination of shapes 333 and fold 226 and next to ridges 227 the area between shapes 334 and fold 228. Once shapes 230 and 227 are brought together, spaces 334 and 335 serve to bridge the width of the channel created by shapes 230 and 227. This allows spaces 336 and 230 to be sealed or affixed together.

Were shapes 227 and 230 formed from separate sheets an identical mechanism to seal and bring together spaces 334 to 335 and 336 to 337 would be employed.

Dimples 340 are formed and are employed as locators as well as providing added support as the dimples most often overlap. The centers of dimples 340 have apertures 347 through the media sheet in order to facilitate wetting of sheet 201.

FIG. 3C is an end view detail of an assembly detail of FIGS. 3A and 3B is shown. Channels 341 and 342 are created by the edge structures shown in FIGS. 3A and 3B while channel 43 is formed by the shapes found in platen 20. Bends 332 and 333 allow channels 341 and 342 to be closed at areas 337 and 336. Areas 38 and 339 are bent along lines 331 and 332 such that they are positioned one above the other thus allowing a seal to be made between the two.

FIGS. 3D and 3E illustrate how the tops 221, 223 of the sheets forming the channels are crimped together and bent over. FIG. 3F illustrates in greater detail the positioning of the bent over tops showing how the moisture emitting dimples 340 distribute fluids into the channels.

Figure 4A:
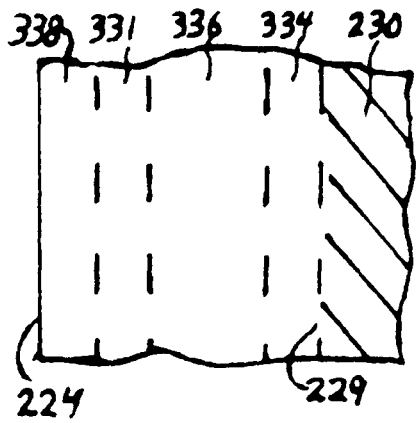
FIG. 4A and FIG. 4B each illustrate portions of the media utilized in the embodiment of FIG. 1.
Figure 4B:
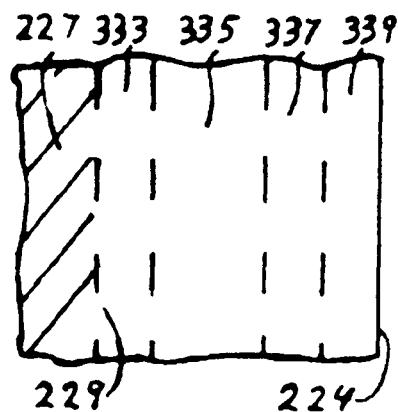

FIG. 4A and FIG. 4B are expanded views of portions of sheet 201 illustrating the structure for providing air flow alternate channels and directed to the perimeter spaces defined by edge 224 and fold 229. Next to ridges 230, there is adjacent wall 334 followed by walls 336, 331, 338. Next to ridges 227 in FIG. 4B there are adjacent walls 333, 335, 337, and 339. The configuration of these walls creates space for air movement into or from alternate channels. Dimples, that are not shown, may be employed to stabilize areas 335, 336 providing control of spacing.

Figure 5A:
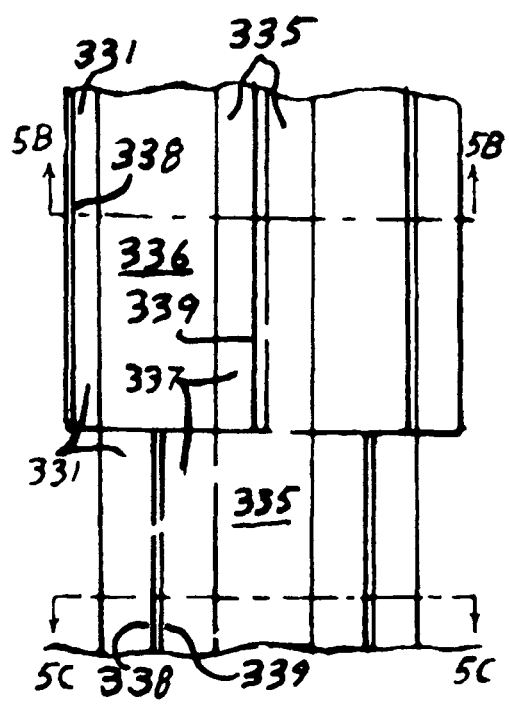
FIG. 5A is a partial front view of the embodiment of FIG. 1.

FIG. 5A is a frontal edge view of a portion 501 of module 100 showing openings 335, 336 for two air streams.

Figure 5B:
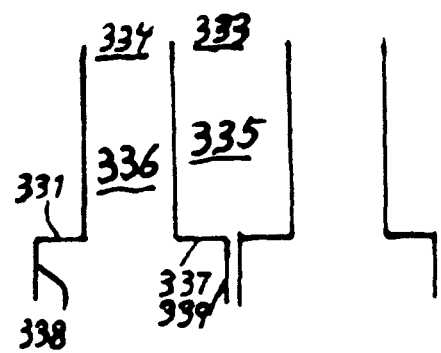
FIG. 5B and FIG. 5C are cut away views taken along lines 5B-5B and 5C-5C of FIG. 5A.
Figure 5C:
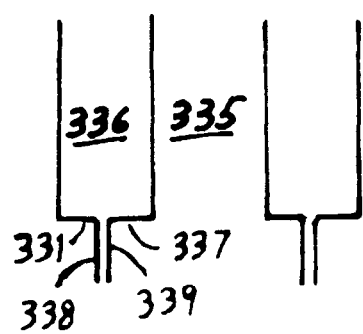

FIG. 5B displays upper openings 336 whereas FIG. 5C displays the lower openings 335 in a plan view. The detail portion of platen 200 shown in FIG. 4A is also shown in FIG. 5A as edge of wall 338, wall 339, and air space 336. In the lower portion of FIG. 5A alternate bends of walls 331 and 338, 337, and 339 effectively close the upper opening of space 336 as seen in cross-section of FIG. 5B while, as shown in FIG. 5C, provide an opening 335. This alternating structure of channel airflows follows throughout module 100 of FIG. 1.

In various embodiments, an air inlet for a channel would be towards the top of module 100 and the air outlet situated towards the bottom of the same channel. The alternate channels have the opposite positioning of inlet and outlet thus creating a diagonal pattern of airflows. In order to reduce pressure resistance, channels near egress and ingress may be increased in width beyond the normal with of the channel.

This alternation would generally take place in the areas delineated by numerals 335 and 336 of FIG. 4A and FIG. 4B.

Figure 6:
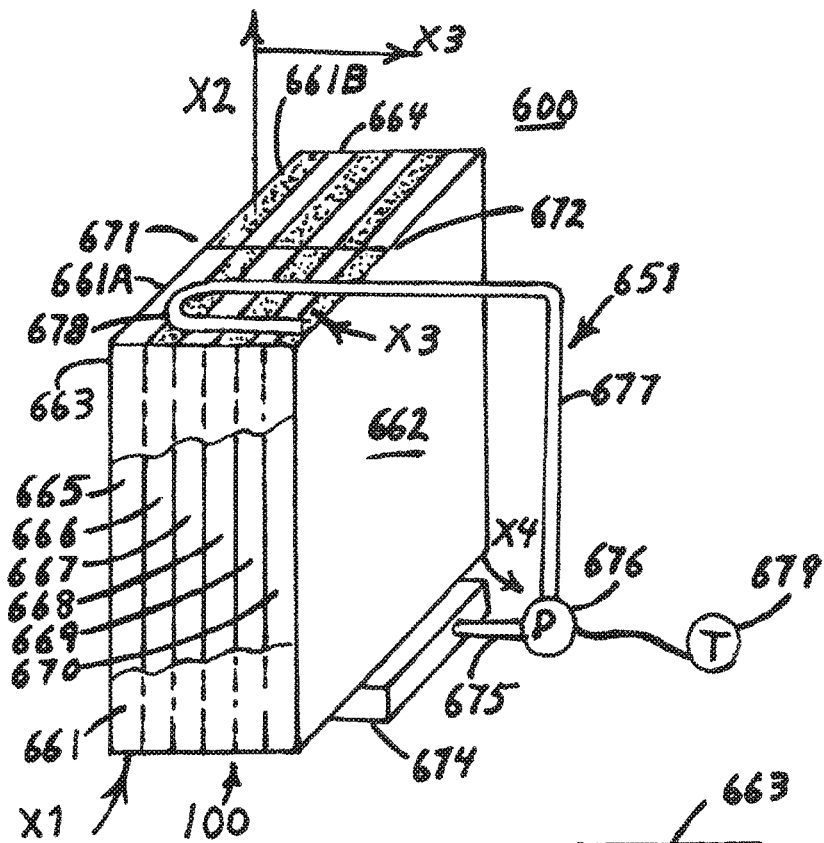
FIG. 6 is an isometric and schematic representation of a first system embodiment.

FIG. 6 illustrates an embodiment of a system 600 incorporating media block 100 of FIG. 1. System 600 is bounded along its sides by sheets 661 and 662 and along its ends by using end portions of sheet 661 and its adjacent sheets 661A and 661B, for example, to form channel seals. Closures form the end terminus of assembly ends 663 and 664. System 600 comprises, for illustration purposes, six channels 665, 666, 667, 668, 669, 670. System 600 typically has one hundred or more channels. The top 671 of system 600 is segregated by separator 672 that is disposed perpendicular to the course channels 665, 666, 667, 668, 669, 670. Channel 665, for instance is closed in segment 661A and open in segment 661B. Channel 666 has opening in the opposite segments, i.e., open in segment 661A and closed in segment 661B. This sequence of alternate openings and closures persists throughout media block 100.

Figure 7:
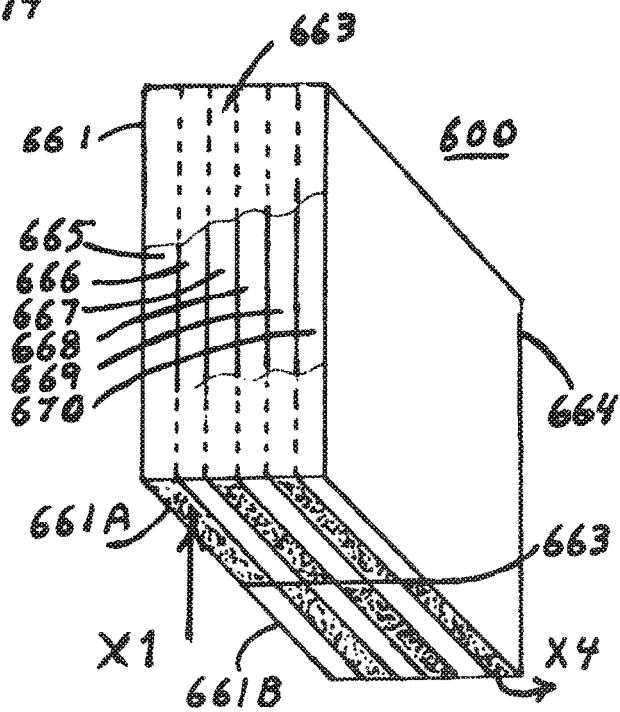
FIG. 7 is an isometric view of the embodiment of FIG. 6 looking upward with the bottom portions and end portions partially broken away.

As seen in FIG. 7 channel 665 in segment 661A is open and closed in segment 661B. Throughout FIG. 7, a pattern contrary to the open or closed pattern established for channels 665, 666, 667, 668, 669, and 670 as found in FIG. 6. This alternate open and close scenario is evident throughout bottom assembly position 663 as well as with the pattern of top assembly position 661.

Returning to FIG. 6, system 600 comprises apparatus 651 to wet channels 666, 668, and 670 in segment 661A. Apparatus 651 includes collection basin 674, pipe 675 leading to pump 676 followed by pipe 677 that connects with water distributor 678. Water distributor 678 comprises a perforated tube. In other embodiments alternate wetting apparatus may be used, such as low-pressure nozzles. Wetting may not be continuous and apparatus for controlling fluid control may be provided such as timer 679.

Again turning to FIG. 7, channels 666, 668, 670 are shown closed in segments 661A thus causing liquids discharged from water distributor 678 to exit channels 666, 668, 670 that are open in segment 661B thereby providing liquid drainage from channels 666, 668, 670 into basin 674 from which the liquid may again be distributed. Basin 674 is spaced apart from media module 100 with sufficient space to allow gas to pass between media module 100 and basin 674.

In operation, an air stream X1, normally ambient air, flows into the section 661A of media module 100 in chambers 665, 667, 669. The air stream flows upward and diagonally through media module 100 and exits at section 661B at the top of media module 100 as shown in FIG. 6. The exiting air stream is divided into two flows X2, X3. Flow X2" may serve as final product air while a portion of this air X3 is returned to media module 100 into channels 666, 668, 670. The secondary air stream X3 flows diagonally through media module 100 and exits channels 666, 668, 670 at the base of media module 100 as shown in FIG. 7. Air stream X3 is wetted generally by water distributor 678. The liquid collected after wetting channels 666, 668, 670 falls into basin 674 where it is recycled.

The temperature within secondary air stream X3 in channels 666, 668, 670 is reduced to near saturated temperature due to liquid present on the walls of channels 666, 668, 670. Thus air stream X1 in channels 665, 667, 669 receives no moisture. However, it approaches the wet bulb temperature of air stream X3 being precooled by its surrounding contact with the alternate air stream X3 that is maintained in a near saturated condition. The air streams in chambers 665, 667, 669 flow generally counter-currently to air streams in chambers 666, 668, 670. As a result of heat transfer occurring between the air streams, indirect evaporative cooling takes place in channels 665, 667, 669 resulting in the cooling of this air without changing its moisture content. This heat transfer occurs as airflow X3 in channels 666, 668, 670 is reduced in temperature by adiabatic transfer, meaning that its energy content is continually exchanges moisture or mass for heat. This heated and humidified air when employing a single media module 100 is discharged to the atmosphere. In this counter-current mode of operation air stream X1 is continually reduced in temperature so the reduced temperature of air stream X3 has a lower wet bulb temperature thereby allowing for further temperature reductions in air stream X1 before its exit as air stream X2.

By way or example, assume air stream X1 is at an ambient outdoor condition of 95° F. dry bulb, 75° F. wet bulb, 0.014 pounds of moisture per pound of air, an energy level of 38 Btu per pound of air, and a relative humidity of 40%. The interaction of heat and mass as reflected in air streams X1 and X3 can be further explained by offering an example wherein the X3 air stream represents 29% of the X1 air stream. Entering into section 661A of FIG. 7, air stream X1 is given as ambient. Air X2 exiting from sector 661B of FIG. 6 has a condition of 72° F. dry bulb, 68° F. wet bulb, 0.014 pounds of moisture per pound of air, an energy level of 33 Btu per pound of air, and a relative humidity of 84%. This delivery condition is possible because of the continual cooling of air stream X1, X2 through its giving up heat to air stream X3, X4. Air stream X4 is a nearly saturated stream, at 90° F. dry bulb, 87° F. wet bulb, 0.028 pounds of moisture per pound of air, an energy level of 52 Btu per pound of air, and a relative humidity of 90% is 5° F. cooler than air stream X1. This temperature offset is caused by the thermal interference caused by the heat transfer resistances attributed to the wall thickness and water impermeable material separating the air streams. The energy balance compares the difference of the energy of 38 Btu per pound of air stream X1 entering media module 100 and its leaving energy at air stream X2 of 32 Btu per pound of air or 6 Btu differential and the difference of the energy of 32 Btu per pound of air stream X3 entering media module 100 and its leaving energy at X4 of 52 Btu per pound of air or a differential of 20 Btu per pound of air. Air stream X1, X2 has an air mass flow of 3.5 times that of air stream X3,X4 meaning that both air streams exchange 20 Btu per pound of air.

The embodiment of FIG. 8 is a modification of the embodiment shown in FIG. 6 and FIG. 7. The embodiment of FIG. 8 has the same mechanical aspects as the embodiment of FIG. 6 and FIG. 7 except that the gas streams are orientated horizontally. Ambient air stream X1 enters chambers 665, 667, 669 passing through media module 100 and exiting as air stream X2 at end sheet 661. A portion X3 of air stream X1 is diverted into channels 666, 668, 670 and flows through media module 100 flowing counter-currently to air stream X1. Wetting of channels 666, 668, 670 is along the top of these channels. Wetting apparatus 869 may comprise wetted cloth or other material that allows liquids to pass into channels 666, 668, 670 but contains the airflow within the designated channels.

Basin 674 may be located under the full length of media module 100 with outlet pipe 675 connecting to pump 678 wherein pipe 677 connects to distributer 678 which is shown as a single distributor but may be subdivided into additional structure to insure adequate wetting for channels 666, 668, 670. The performance of media module 100 with its horizontally directed air flows is the same as that found in the vertically directed air flows of media module 100 shown in FIG. 6 and FIG. 7.

Figure 8A:
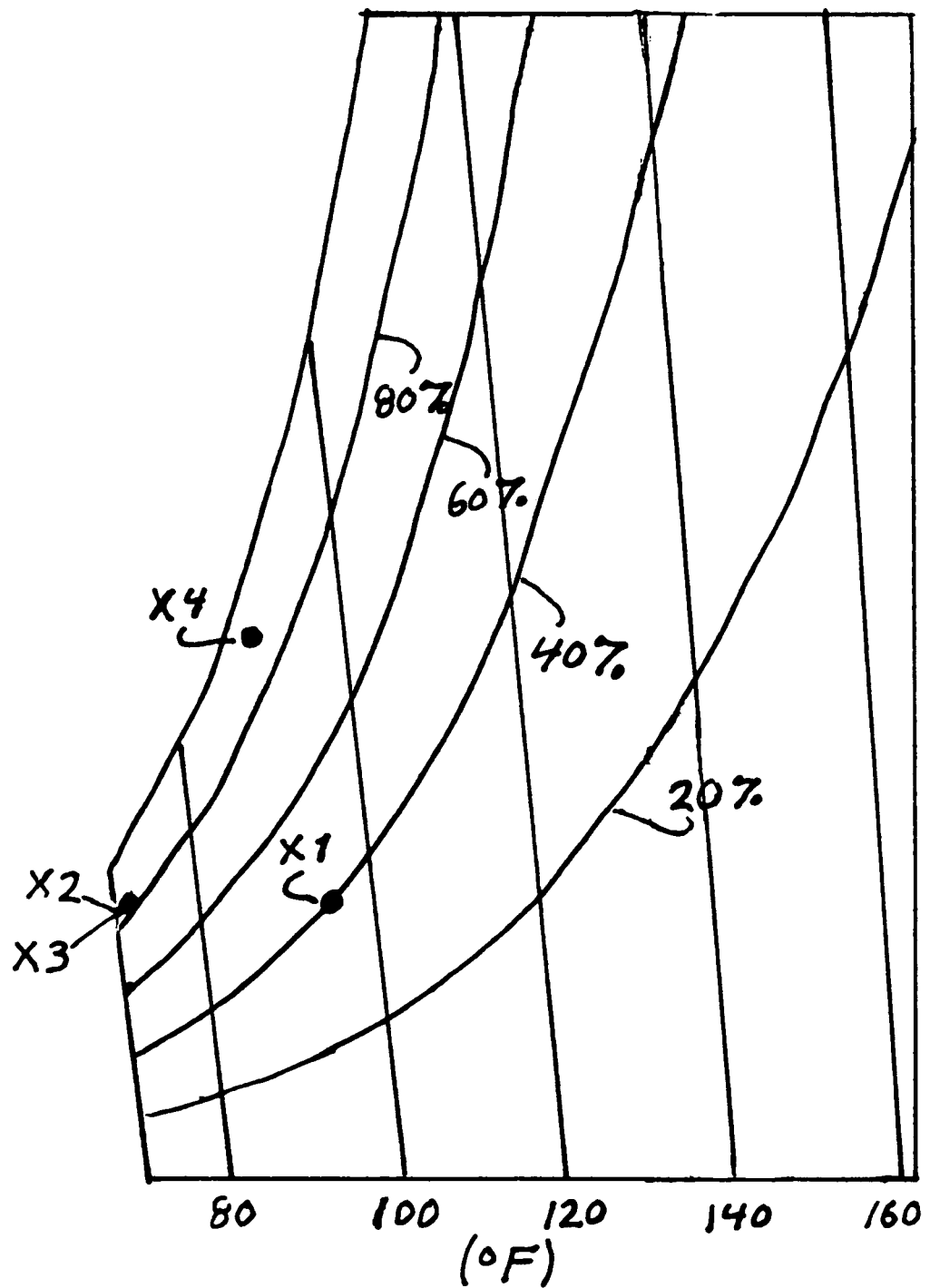
FIG. 8A is a psychrometric chart of the second system embodiment.

FIG. 8A illustrates operation of the embodiment of FIG. 8 in a psychometric chart, and FIG. 8b is a table of the corresponding state point data.

In further embodiments, the entrance and exit of the airflows may all or partially be relocated. For example, airflow X1 could be redirected to location Y1, airflow X2 could be moved to Y2, airflow X3 could be moved to Y3, and airflow X4 could be moved to Y4.

FIG. 9 shows another embodiment that included two media modules 100A, 100B that are thermally connected via air streams. The embodiment of FIG. 9 is primarily directed to desalination of brackish or sea water. Each module 100 is the same as earlier described with respect to FIG. 6 and FIG. 7 or FIG. 8.

With respect to module 100A, entering air stream X1 passes through media module 100A exiting as air stream X2. A portion X3 of air stream X2 is again diverted into alternate channels of module 100A and generally flows counter-currently to the X1, X2 air stream exiting module 100A as air stream X4. Air stream X4, saturated and near the temperature of entering air stream X1, enters module 100B in channels 66, 68, and 70. Air stream X4 when exits module 60B as air stream X6. Air stream X6 joins with air stream X5 that is the X2 air stream less diverted air stream X3 creating air stream X7. Air stream X7 enters module 60B counter-currently to channels 666, 668, 670 in channels 665, 667, 669. Air stream X7, now containing an amount equal to air stream X1 with some additional vapor, exits media module 100B as air stream X8. In other operating procedures air stream X6 may be exhausted to the environment wherein air stream X8 is reduced by the contents of air stream X6. Although there are alternate placements to propel air through media module 100A and media module 100B, air movement device 979 is shown after the combination of air streams X2, X6 while air stream X4 is moved to module 100B via air movement device 980. A pump 976 coupled to reservoir 974 via pipe 975. Pump 976 provides water to media module 100 through distributor 978. Pump 976 and reservoir 974 along with the fluid transport components are not required for media module 100B as condensate is collected into its reservoir 974A.

Operation of modules 100A and 100B of FIG. 9 in combination can be explained by way of example. An ambient air stream is assumed to contain a temperature of 95° F. dry bulb, 75° F. wet bulb, 0.014 pounds of moisture per pound of air, an energy level of 38 Btu per pound of air, and a relative humidity of 40%. This ambient air temperature is increased by 45° F. by a heater (not shown) to 140° F. dry bulb, 86° F. wet bulb, 0.014 pounds of moisture per pound of air, an energy level of 50 Btu per pound of air, and a relative humidity of 11% and is shown as air stream X1. The interaction of heat and mass as reflected in air streams X1-X2 and X3-X4 depends upon the ratio of the two air streams, in this case X3-X4 representing 13% of air stream X1-X2. Air stream X2 has a condition of 72° F. dry bulb, 69° F. wet bulb, 0.014 pounds of moisture per pound of air, an energy level of 33 Btu per pound of air, and a relative humidity of 84%. This delivery condition is possible because of the continual cooling of air stream X1, X2 through its giving up heat to air stream X3, X4 assumed for this example. Air stream X3 when exiting media module 100A as air stream X4 is a nearly saturated stream, at 135° F. dry bulb, 131° F. wet bulb, 0.115 pounds of moisture per pound of air, an energy level of 162 Btu per pound of air, and a relative humidity of 90% and is noted to be 5° F. cooler than air stream X1, X2 at the same locations throughout movement in media module 100A. Again, this temperature offset is caused by the thermal interference caused by the heat transfer resistances attributed to the wall thickness and water impermeable material separating air streams X1, X2 and X3, X4. The energy balance compares the difference of the energy of 49.55 Btu per pound of air stream X1 entering media module 100A and its leaving energy of 33 Btu per pound of air or 16.77 Btu difference. The difference of the energy of 33 Btu per pound contained within air stream X3 entering media module 100A and its leaving energy, shown as air stream X4, containing 162 Btu per pound of air is 129 per pound of air. The ratio of air mass flows is 6.7 to 1 thus the change in energy of X1-X2 is 6.7 times 16.7 Btu or 129 Btu, the same as energy change in air stream X3-X4.

Turning to media module 100B, air stream X4 is in a highly saturated condition with a temperature of 135° F. dry bulb, 131° F. wet bulb, 0.115 pounds of moisture per pound of air, an energy level of 162 Btu per pound of air, and a relative humidity of 90%. Heat transfer occurring within air stream X4, X6 is caused by heat transfer to air stream X7, X8. As airstream X4, X6 cools, condensation occurs with condensate collected in basin 74. Air exiting from channels 665, 667, 669 designated as X6 would have a condition of 77° F. dry bulb, 77° F. wet bulb, 0.020 pounds of moisture per pound of air, an energy level of 40 Btu per pound of air, and a relative humidity of 100% owing to its condensation. Air stream X7 is a combination of the X5 air stream and the X6 air stream with an approximate condition of 73° F. dry bulb, 70° F. wet bulb, 0.015 pounds of moisture per pound of air, an energy level of 34 Btu per pound of air, and a relative humidity of 87%. When exiting module 60B and shown as air stream X8 conditions of 130° F. dry bulb, 84° F. wet bulb, 0.015 pounds of moisture per pound of air, an energy level of 48 Btu per pound of air, and a relative humidity of 16%. The energy balance compares the difference of the energy of 162 Btu per pound of air stream X4 entering media module 100B and its leaving energy of 40 Btu per pound of air or a Btu differential 122 Btu per pound of air. The spread of energy between air stream X7 and air stream X8 is 48 less 34 or 14 Btu per pound of air. After adjusting for temperature offsets the air ratio between the two streams approximates that set for the ratios found in module 60A. In total, the energy input and output of the system balances excluding additions such as air and liquid movement devices.

Figure 10:
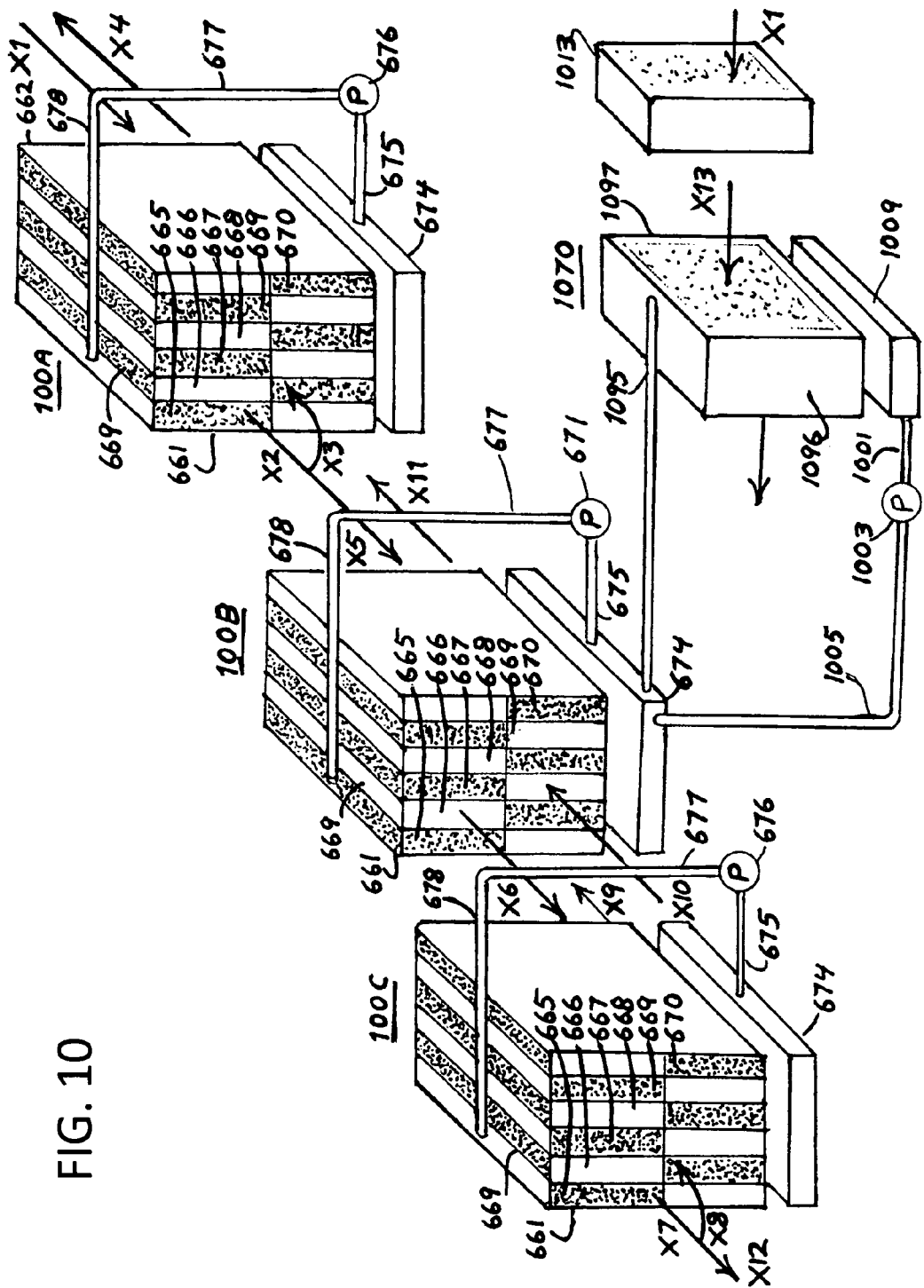
FIG. 10 is an isometric and schematic representation of a fourth system embodiment.

FIG. 10 shows an embodiment that incorporates three media modules 100A, 100B, 100C. The embodiment shown in FIG. 10 is primarily directed to air conditioning and dehumidification. The detailed configuration of each media module 100A, 100B, 100C is the same as described herein above. In most cases operation of the media modules 100A, 100B, 100C proceeds as earlier described. In the first module 100A, entering air stream X1 passes through media module 100A exiting as air stream X2. A portion X3 of air stream X2 is again diverted into alternate channels 666, 668, 670 of media module 100A and generally flowing counter-currently to air stream X1, X2 and exits media module 100A as air stream X4. Air stream X2 is reduced by the flow of air stream X3 and net air stream X5 exits media module 100A. The configuration of media module 100B is likewise as earlier described.

Air stream X5 exits media module 100A through channels 666, 668, 670 of media module 100B as channels 666, 668, 670 are receptive to channel wetting. Air stream X5 exits as air stream X6. In most cases the liquid utilized for wetting is a liquid desiccant, generally lithium bromide or calcium chloride, for example. Air stream X10 flows generally counter-currently to air stream X5, X6 and may be of outside ambient air or may be from air from a building if a supply is available. Air stream X6, with a lower absolute humidity and a lower temperature that had the heat of air dehydration not been partially exchanged with air stream X10, X11, enters media module 100C via channels 665, 667, 669. Media module 100C follows the same description and air movement patterns as found in media module 100A. Air exiting media module 100C as air stream X7, is again subdivided with a portion of the air, shown as air stream X8, diverted back through channels 666, 668, 670 of media module 100C. This air exits media module 100C as air stream X9 while the primary air stream exits as air stream X12.

Operation of the combination can best be explained through example. Media module 100A yields the same output as found when describing the functionality of media module 100 hereinabove in reference to FIG. 6. The relative humidity of air stream X5, the net air stream leaving media module 100A has a relative humidity of 84%. This higher humidity air stream enters media module 100B where it is contacted by a liquid desiccant. The strength of this liquid desiccant is sufficient to remove moisture from air stream X5 such that the air exiting module media module 100B would normally increase in temperature because of the adiabatic change. This temperature increase is mitigated by employment of air movement by air streams X10, X11. The airstream X10, X11 airflow may be from the inside of an air-conditioned space with a dry bulb temperature of 80° F. and web bulb temperature of 67° F., for instance, and when based on the assumption of a 5° F. offset and not more than 90% relative humidity. Heat exchange should allow air stream X5, X6 to exit media module 100B as air stream X6 with conditions of 85° F. dry bulb, 60° F. wet bulb, 0.005 pounds of moisture per pound of air, an energy level of 26 Btu per pound of air, and a relative humidity of 20%. Air stream X6 enters media module 100C wherein its exiting air, shown as air stream X7, is subdivided such that secondary air stream X8 represents one-third of air stream X7. Air stream X7 exiting module 60C would have a condition of 55° F. dry bulb, 49° F. wet bulb, 0.005 pounds of moisture per pound of air, an energy level of 19 Btu per pound of air, and a relative humidity of 56%. This delivery condition is possible because of the continual cooling of air stream X6, X7 through its giving up heat to air stream X8, X9. Airstream X9 has nearly saturated air, at 80° F. dry bulb, 78° F. wet bulb, 0.020 pounds of moisture per pound of air, an energy level of 42 Btu per pound of air, and a relative humidity of 90% is noted to be 5° F. cooler than air stream X4 at the same location. This temperature offset is caused by the thermal interference caused by the heat transfer resistances attributed to the wall thickness and water impermeable material separating air streams X6, X7. The energy balance compares the difference of the energy of 26.0 Btu per pound of air stream X6 entering module 60C and its leaving energy of 19 Btu per pound of air or 7 Btu differential and the difference of the energy of 19 Btu per pound of air stream X8 entering module 60C and its leaving energy of 35 Btu per pound of air at air stream X9, or 17. The energy balance is airflow X6-X7 is 2.3 times that of airflow X8-X9.

Figure 10A:
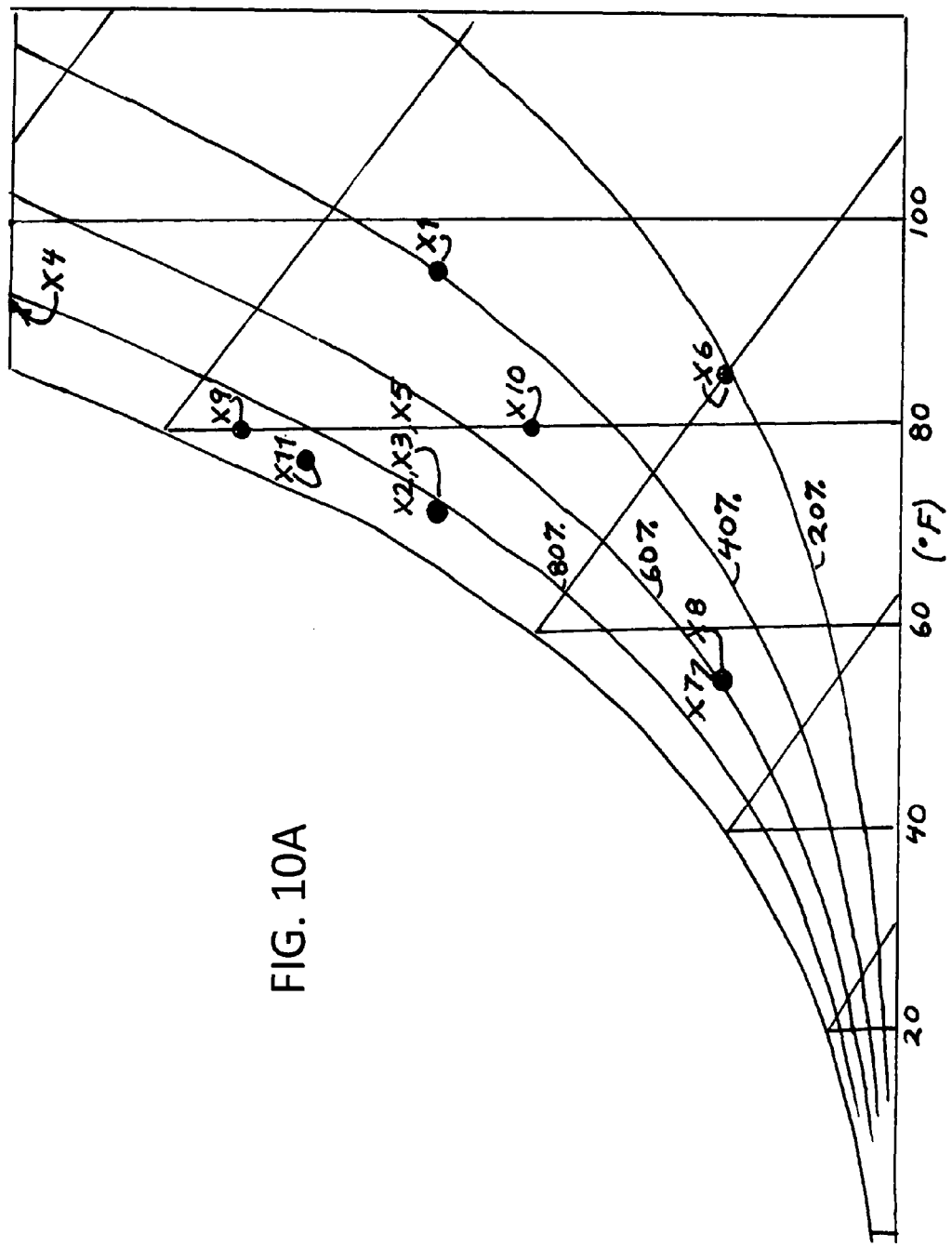
FIG. 10A is a psychrometric chart of the fourth system embodiment.

FIG. 10A illustrates operation of the embodiment of FIG. 10 in a psychometric chart, and FIG. 10*b* is a table of the corresponding state point data.

Media module 100A and media module 100C reduce the percentage of conditioned air relative to the initial air intake of air stream X1. Air stream X3 of media module 100A has been stated to represent 29% of XI leaving a residual of 7% at air stream X5. Energy balances of module 60B indicate that 37% of air stream X6 is diverted to air stream X8. Delivery air, shown as air stream X12, is the combination of these two air flow reductions leaving a net output of 45% of slightly less than air flow X1.

The embodiment of FIG. 10 of removes moisture absorbed from air stream X5 by a desiccant as it flows through media module 100B. A desiccant regenerator is shown as regenerator 1070 and is connected to media module 100B by means of pipe 1095. Regenerator 1070 is bounded by end walls 1096, 1097 and cover 1098 and the base being the upper portion of basin or reservoir 1099. The media, described hereinabove, fills the area so bounded. The sides of regenerator 1070 are open to air stream X12 which passes through regenerator 1070 parallel to walls 1096 and 1097. Liquid desiccant from basin 1099 of regenerator 1070 is distributed via pipe 1095. Liquid desiccant upon reaching basin 1099 is returned to basin 674 by means of pipe 1001 connecting to pump 1003 and then flowing onward through pipe 1005.

Moisture is removed from the desiccant through device 1070 by using air stream X1 if is sufficiently dry to evaporate moisture. The comparison can be related to the relative humidity of air being dehumidified by the desiccant and the relative humidity of the ambient air. In the event the differential is insufficient, the relative humidity of air stream X1 can be lowered by increasing its temperature by passing through a heater 1013 with the air stream emerging as air stream X13. The source of the heat may be a gas flame, electrical coils, or from a solar air heater, for instance.

Figure 11:
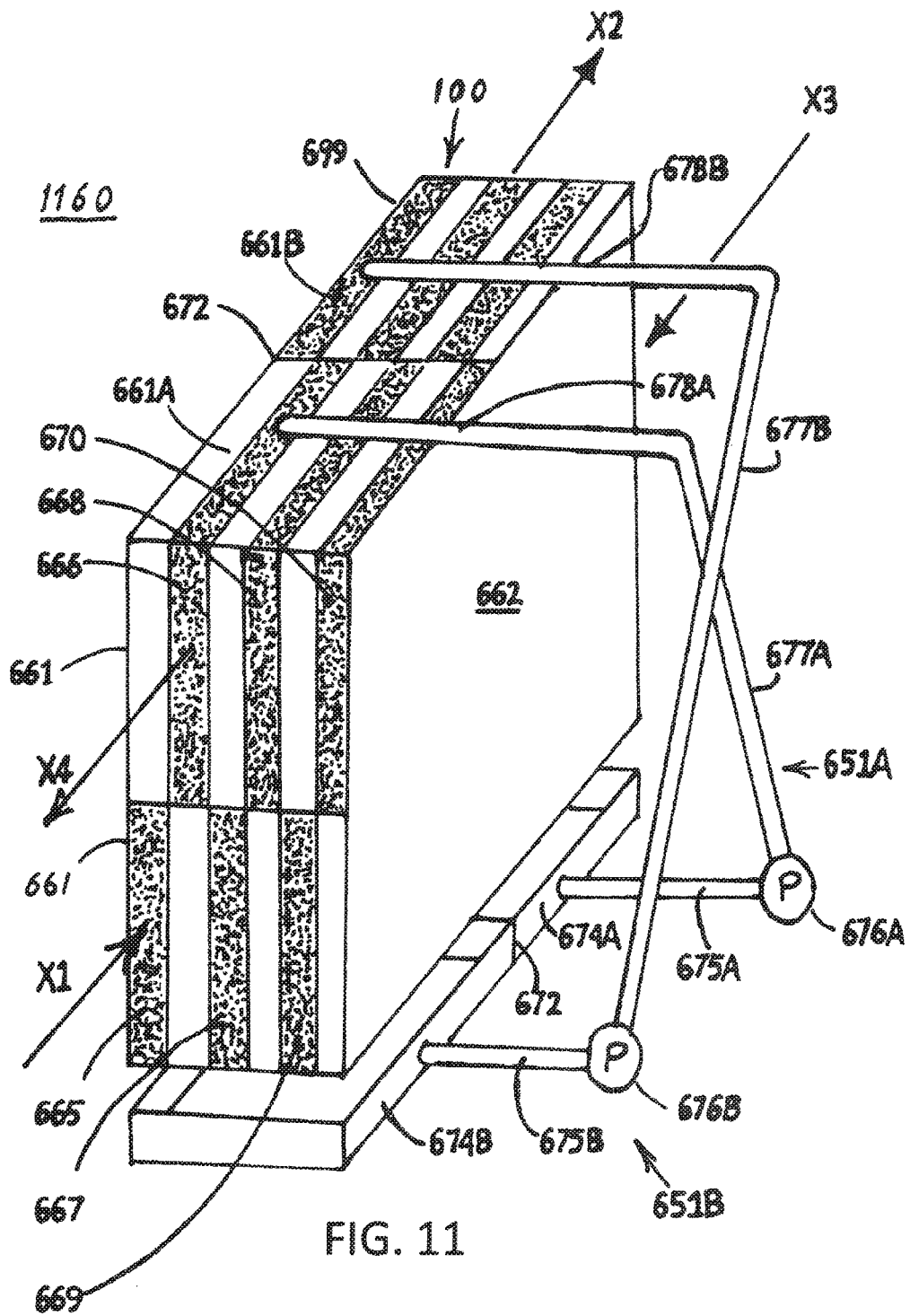
FIG. 11 is an isometric and schematic representation of a fifth system embodiment.

The embodiment 1160 of FIG. 11 contains the same mechanical aspects as the embodiment of FIG. 8 with the orientation of two separate air streams being counter-flow in the horizontal direction. Media module 100 is bounded along its sides by sheets 661, 662. Media module 100 contains, for illustration purposes, six channels 665, 666, 667, 668, 669, 670 although media module 100 may have one hundred or more channels.

Two separate air streams X1, X3 are shown although a portion of an air stream may account for one of the air streams. Air stream X1 enters channels 665, 667, 669 passing through media module 100 exiting as air stream X2. Air stream X3 flows through channels 666, 668, 670 and exits as air stream X4. The top of media module 100 is segregated by separator 672 that is disposed perpendicular to the course of the channels 665, 666, 667, 668, 669, 670. Channel 665, for instance is closed in segment 661A and open in segment 661B, while channel 666 has openings in the opposite segments. This sequence of alternate openings and closures persists throughout media module 100. Wetting of all channels 665, 666, 667, 668, 669, 670 are along the top of these channels. Channels 665, 666, 667, 668, 669, 670 include apparatus 699 such as wetted cloth or other material that allows liquids to pass into channels 665, 666, 667, 668, 669, 670 but contains the airflow with in the designated channels. There are two wetting apparatus 651A, 651B that may be co-flow to the air stream or may be counter flow. The liquids in each wetting apparatus 651A, 651B are generally different, for example, one being water and the other a liquid desiccant. One wetting stream flows from basin 674A through pipe 675A to pump 676A where the liquid is pumped via pipe 677A to distributor 678A wetting channels 666, 668, 670 in section 661A which allows a flow of liquid through the media running counter-currently to air stream X3, X4. A second wetting stream flows from basin 674B through pipe 675B to pump 676B where the liquid is pumped via pipe 677B to distributor 678B wetting channels 665, 667, 669 in section 661B which allows a flow of liquid through the media running counter-currently to air stream X1, X2. The combination of two wetting streams is advantageous in certain applications. For instance the heat generated by a liquid desiccant removing moisture from an air stream can be passed to an air stream containing wetting, a condition that allows for heat transfer when compared to only air.

Figure 12:
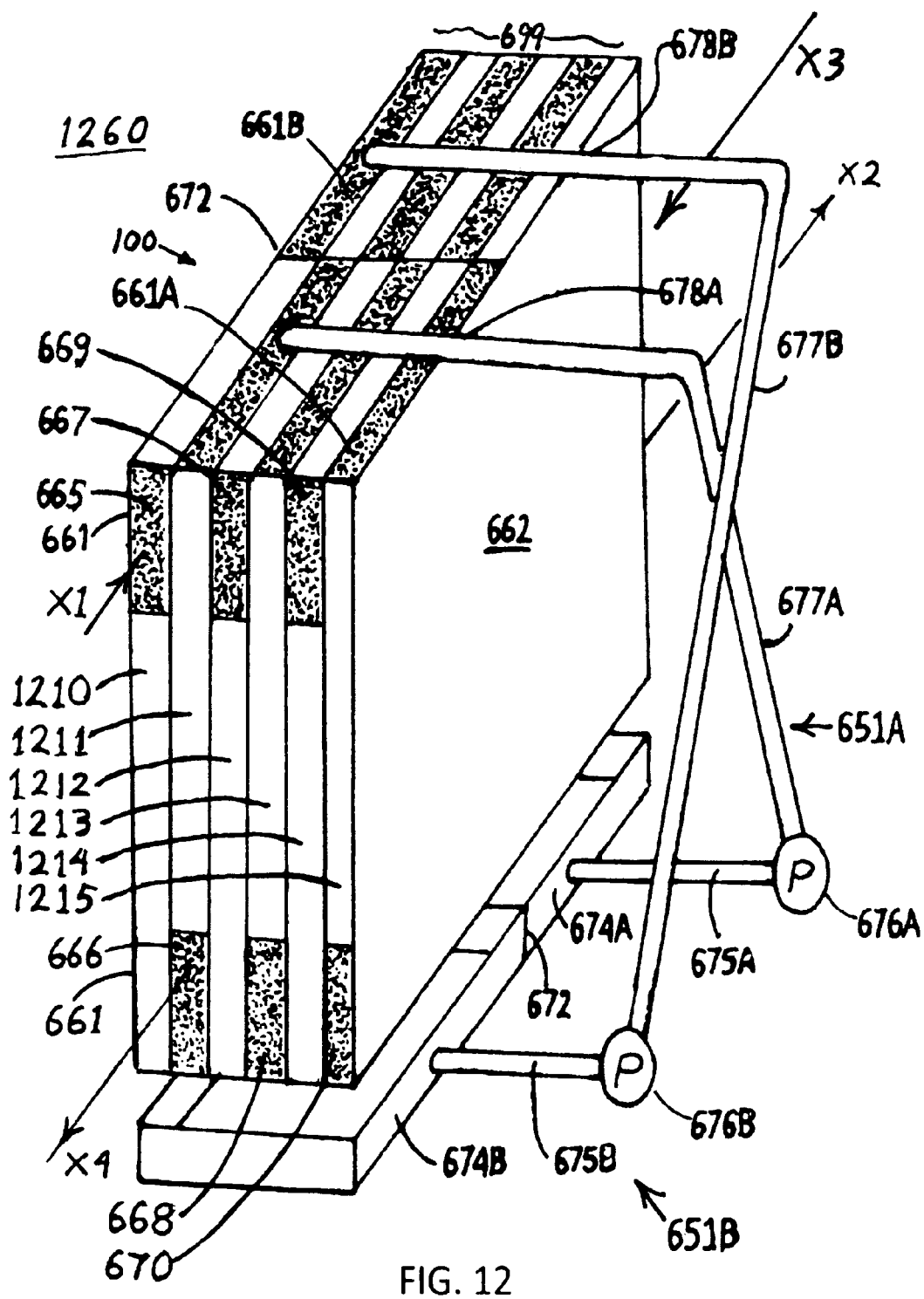
FIG. 12 is an isometric and schematic representation of a sixth system embodiment.

FIG. 12 illustrates another embodiment 1260 that contains the same general mechanical aspects as embodiment 1160 of FIG. 11. Although the air entrances and exits are in the horizontal plane and as media module 100 is considered to have a height greater than its other dimensions the overall orientation of two separate air streams is primarily vertical. Media module 100 is bounded along its side by sheets 661, 662. Media module 100 contains, for illustration purposes, six channels 665, 666, 667, 668, 669, 670 although media module 100 may have one hundred or more channels. Two separate air streams X1, X3 are shown although a portion of an air stream may account for one of the air streams. Air stream X1 enters channels 665, 667, 669 passing through media module 100 exiting as air stream X2. The entrances for air stream X1, X2 are partially blocked in channel 665 by blockage 1210, in channel 667 by blockage 1212 and in channel 669 by blockage 1214 allowing air stream X1 to enter into the top portions of these channels. At the opposite end of media module 100, the orientation of the blockages is to permit air stream X2 to leave at the lower portion of the channels. Air stream X4 exits channels 666, 668, 670 passing through media module 100. The exits for air stream X3, X4 are partially blocked in channel 666 by blockage 1211, in channel 668 by blockage 1213 and in channel 670 by blockage 1215 allowing air stream X4 to exit from the bottom portions of these channels. At the opposite end of media module 100 the orientation of the blockages is to permit air at airstream X3 to enter at the top portion of the channels. The top of media module 100 is segregated by separator 672 disposed perpendicular to the course of the channels 665, 666, 667, 668, 669, 670. Channel 665, for instance is closed in segment 661A and open in segment 661B while channel 666 has opening in the opposite segments. This sequence of alternate openings and closures persists throughout media module 100.

Wetting of all channels is along the top of these channels wherein these channels include wetting apparatus 699 such as wetted cloth or other material that allows liquids to pass into the channels but contains the air flow with in the designated channels. There are two wetting apparatus 651A, 651B that may be co-flow to the air stream or may be counter flow. The liquids in each wetting apparatus 651A, 651B are generally different, for example, one being water and the other a liquid desiccant. One wetting stream flows from basin 674A through pipe 675A to pump 676A where the liquid is pumped via 677A to distributor 678A wetting channels 666, 668, 670 in section 661A which allows a flow of liquid through the media running counter-currently to air stream X3-X4. A second wetting stream flows from basin 674B through pipe 675B to pump 676B where the liquid is pumped via 677B to distributor 678B wetting channels 665, 667, 679 in section 661B which allows a flow of liquid through the media running counter-currently to air stream X1-X2.

Figure 12A:
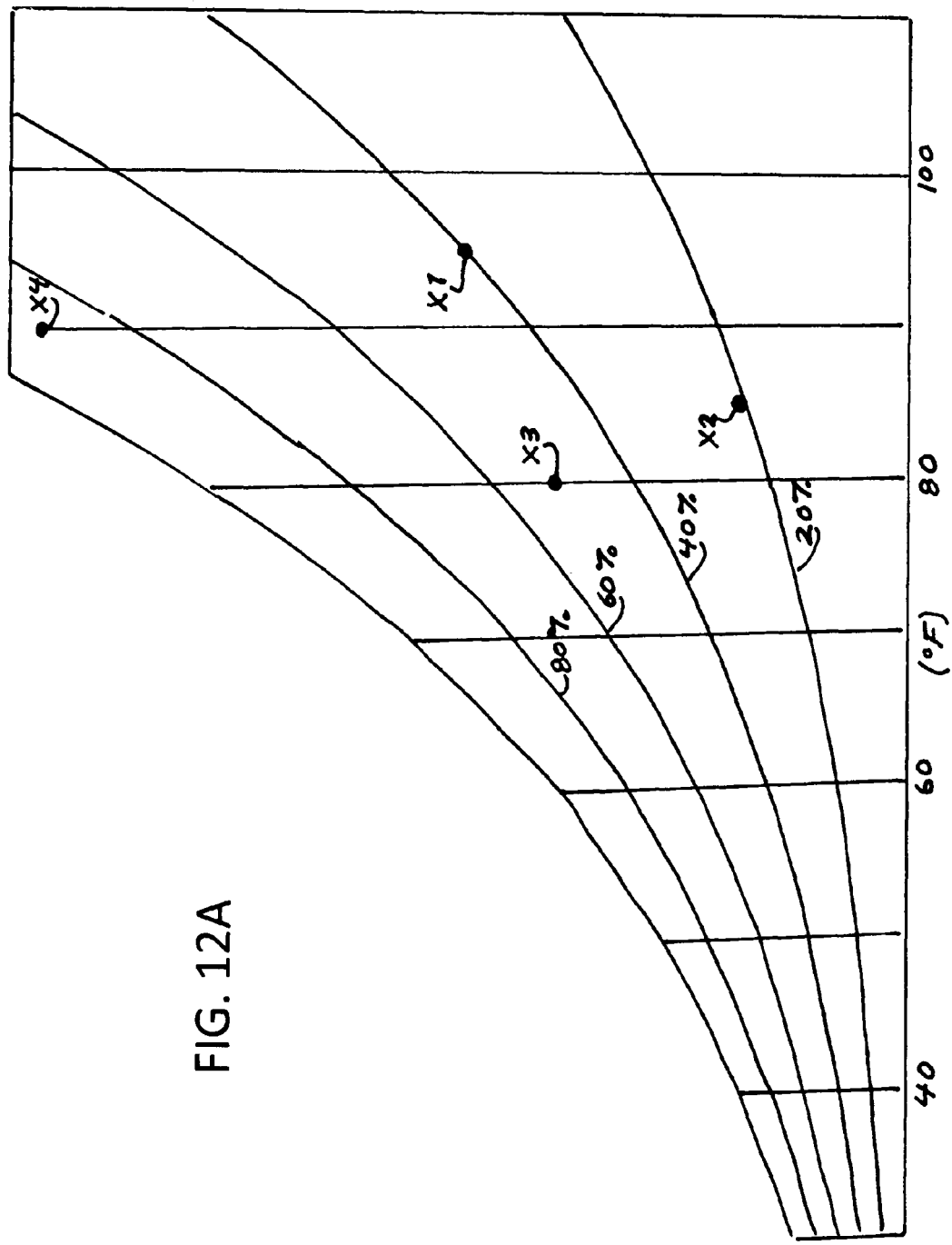
FIG. 12A is a psychrometric chart of the sixth system embodiment.

FIG. 12A illustrates operation of the embodiment of FIG. 12 in a psychometric chart, and FIG. 12b is a table of the corresponding state point data.

Figure 13:
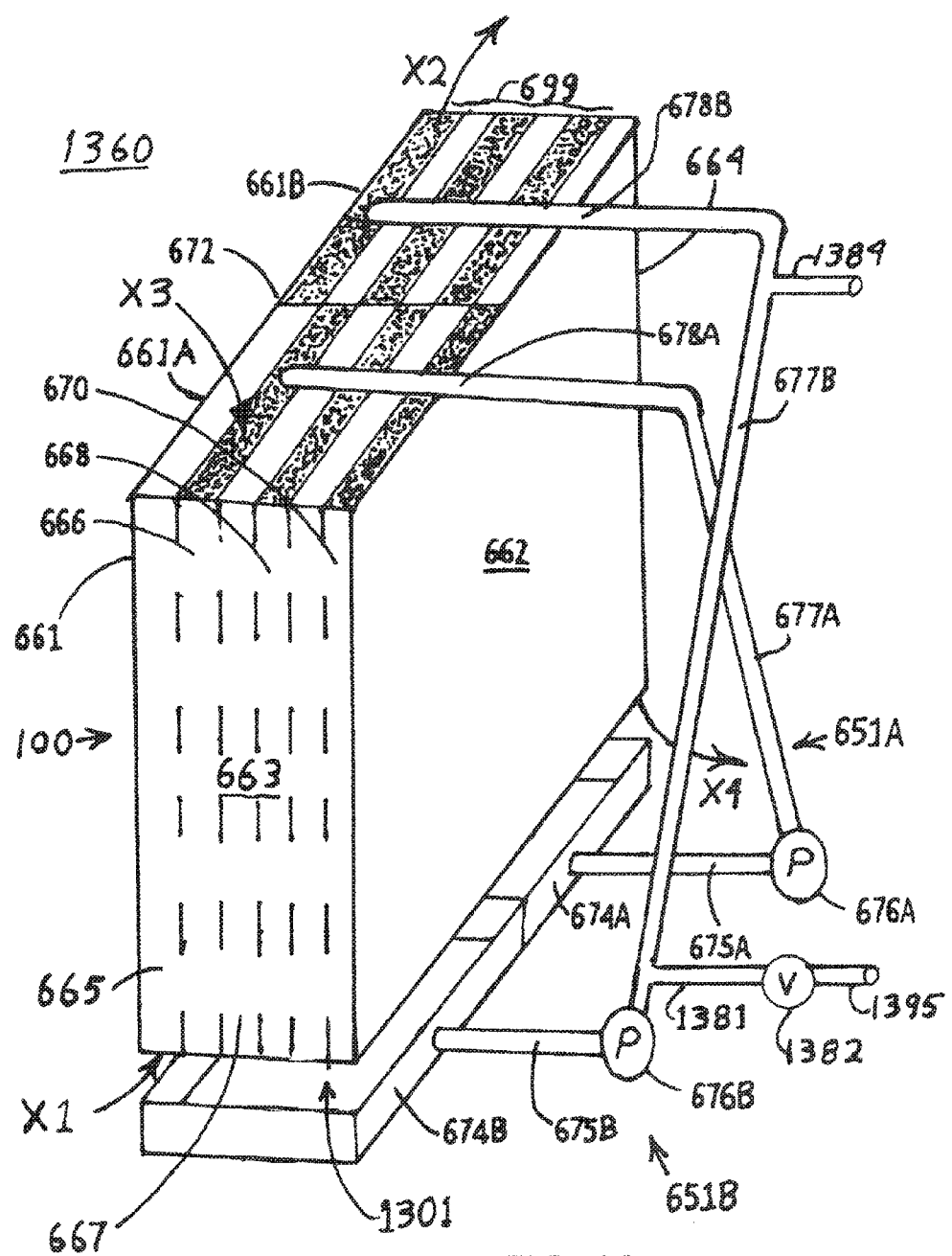
FIG. 13 is an isometric and schematic representation of a seventh system embodiment.

FIG. 13 illustrates an embodiment 1360 contains the same general mechanical aspects as embodiment 1260 of FIG. 12. Although the air entrances and exits are in the horizontal plane and as module 100 is considered to have a height greater than its other dimensions the overall orientation of two separate air streams is primarily vertical. Media module 1000 is bounded along its sides by sheets 661, 662 and on its ends by sheets 663, 664. Media module 100, for illustration purposes, comprises six channels numbered respectively 665, 666, 667, 668, 669, 670 although media module 100 may have one hundred or more channels. Two separate air streams X1, X3 are shown although a portion of an air stream may account for one of the air streams. Air stream X1 enters channels 665, 667, 669 in a space 1301 between media module 100 and basin 674B and after passing through media module 100 exits through the top of media module 100 in a designated location 661B as air stream X2. Air stream X3 enters channels 666, 668, 670 at the top of the channels in a space 661A and exits channels 666, 668, 670 in space 1301 between these channels and basin 674A as air stream X4. The top of media module 100 is segregated by separator 672 disposed perpendicular to the course of channels 665, 666, 667, 668, 669, 670. Channel 665, for instance is closed in segment 661A and open in the segment 661B while channel 666 is open in the opposite segments. This sequence of alternate openings and closures persists throughout media module 100. Wetting of all channels is along the top of these channels wherein these channels include apparatus 69 such as wetted cloth or other material that allows both liquids and air to pass.

There are two wetting apparatus 651A, 651B that may be co-flow to the air stream or may be counter flow and generally if one of the wetting means contains water it will be in co flow with the air stream. The liquids in each wetting apparatus 651A, 651B are generally different, for example, one being water and the other a liquid desiccant. One wetting stream flows from basin 674A through pipe 675A to pump 676A where the liquid is pumped via pipe 677A to distributor 678A wetting channels 666, 668, 670 in section 661A which allows a flow of liquid through the media running counter-currently to air stream X3, X4. A second wetting stream, generally a desiccant, flows from basin 674B through pipe 675B to pump 676B where the liquid is pumped via pipe 677B and where some portion can be diverted via pipe 1381 through flow control valve 1382 to pipe 1395 that directs the desiccant to a regenerator of a type such as regenerator 1013 shown in FIG. 10 for removal of water from the desiccant that was absorbed from air stream X1, X2. The concentrated desiccant is returned from the regenerator 1013 by pipe 1384 to pipe 677B flowing then to distributor 678B wetting channels 665, 667, 669 in section 661B which allows a flow of liquid through the media running counter-currently to air stream X1, X2.

The operation of embodiment 1360 is illustrated by the following example. Air stream X1 is assumed to contain a an ambient outdoor condition with a temperature of 95° F. dry bulb, 75° F. wet bulb, 0.014 pounds of moisture per pound of air, an energy level of 38 Btu per pound of air, and a relative humidity of 40%. Air stream X1 flowing through channels 665, 667, 669 is subjected to wetting by liquid desiccant distributed by distribution tube 678B that exits channels 665, 667, 669 into basin 674B. Air stream X1 then exits media module 100 as air stream X2 at a condition of 85° F. dry bulb, 60° F. wet bulb, 0.009 pounds of moisture per pound of air, an energy level of 26 Btu per pound of air, and a relative humidity of 20%. Air stream X3 is often return air from an occupied space having the condition of 80° F. dry bulb, 67° F. wet bulb, 0.011 pounds of moisture per pound of air, an energy level of 31 Btu per pound of air, and a relative humidity of 50%. Air stream X3 enters media module 100 in a space between the channels and basin 674A. When passing through channels 666, 668, 670 air stream X3 is most often continually wetted by means of distributor 676A with the liquid exiting channels 666, 668, 670 into basin 674A. Wetting of air stream X3 continually depresses the temperature of the air stream towards its wet bulb condition thereby allowing heat from air stream X1, X2 to be moved through the media into air stream X3 which exits media module 100 as air stream X4 with a condition of 90° F. dry bulb, 87° F. wet bulb, 0.028 pounds of moisture per pound of air, an energy level of 52 Btu per pound of air, and a relative humidity of 90%.

Turning now to FIGS. 14, 15, 16, and 17 details of the construction of media module 100 are shown in further detail. As described with respect to FIGS. 3A, 3B, 3C The invention has been described in terms of several embodiments. Those skilled in the art will recognize that various changes and modifications may be made without departing from the nature and scope of the present invention. It is not intended that the invention be limited to the embodiments shown and described herein. It is intended that the invention be limited only by the claims appended hereto.

What is claimed is:

1. Heat exchange apparatus comprising:
 a plurality of thermally conductive, moisture impervious sheets, each said sheet having a corrugated portion comprising a plurality of corrugations;
 said plurality of sheets being disposed in a stack such that each alternate sheet of said plurality of sheets has its corrugations affixed to and disposed at an angle to the corrugations of an adjacent sheet such that the corrugated portions provide a plurality of separate flow pathways;
 said plurality of separate flow pathways comprising first predetermined ones of said pathways and second predetermined ones of said pathways;
 said stack of sheets having first end portions disposed to provide a first inlets and a first outlets for first predetermined ones of said pathways and second end portions to provide second inlets and second outlets for second predetermined ones of said pathways;
 said corrugations forming said second predetermined ones of said pathways comprising a wettable surface;
 said first predetermined ones of said pathways adapted for a first fluid flow and said second predetermined ones of said pathways adapted for a second fluid flow, said first and second fluid flows being countercurrent; and
 said corrugations providing heat transfer between said first and second fluid flows such that a temperature change in one of said first and second fluid flows causes heat transfer to the other of said first and second fluid flows, said corrugations forming said first predetermined ones of said pathways comprising a wettable surface, said corrugations forming said second predetermined ones of said pathways comprising a wettable surface, and further comprising first fluid distribution apparatus to provide first wetting fluid to said first predetermined ones of said pathways.

2. Heat exchange apparatus in accordance with claim 1, comprising:
 second fluid distribution apparatus to provide second wetting fluid to said second predetermined ones of said pathways.

3. Heat exchange apparatus in accordance with claim 2, comprising:
 said first wetting fluid is a first composition provided to said first fluid distribution apparatus; and
 said second wetting fluid is a second composition provided to said second fluid distribution apparatus, said first composition being different from said second composition.

4. Heat exchange apparatus in accordance with claim 2, comprising:
 said first wetting fluid is water; and
 said second wetting fluid is a liquid desiccant.

5. Heat exchange apparatus in accordance with claim 2, comprising:
 said first wetting fluid is water; and
 said second wetting fluid is a water alcohol solution.

6. A heat exchange apparatus comprising:
 a plurality of thermally conductive sheets, each sheet having a first wettable surface and a second moisture impervious surface, each said sheet having a corrugated portion comprising a plurality of corrugations;

said plurality of sheets being disposed in a stack such that each alternate sheet of said plurality of sheets has its corrugations affixed to and disposed at an angle to the corrugations of an adjacent sheet such that the corrugated portions provide a plurality of separate pathways, said plurality of sheets arranged such that said moisture impervious surface of each sheet faces said moisture impervious surface of the adjacent sheet and said wettable surface of each sheet faces said wettable surface of an adjacent sheet such that first predetermined ones of said pathways comprise moisture impervious surfaces and second predetermined ones of said pathways comprise wettable surfaces;

said stack of sheets having first end portions disposed to provide first inlets and first outlets for said first predetermined ones of said pathways and second end portions to provide second inlets and second outlets for said second predetermined ones of said pathways;

said first predetermined ones of said pathways adapted for a first gas flow and said second predetermined ones of said pathways adapted for a second gas flow, said first and second gas flows being countercurrent;

said corrugations providing heat transfer between said first and second gas flows such that a temperature change in one of said first and second gas flows causes heat transfer to the other of said first and second gas flows.

7. Heat exchange apparatus in accordance with claim 6, comprising:
said first gas flow and said second gas flow in the same direction through said heat exchange apparatus.

8. Heat exchange apparatus in accordance with claim 6, comprising:
a pathway configured such that a portion of gas flowing through said first predetermined ones of said pathways is channeled countercurrent through said second predetermined ones of said pathways.

9. Heat exchange apparatus in accordance with claim 6, comprising:
each sheet of said plurality of sheets comprising an edge portion usable to aid distribution of fluid when wetting said second predetermined pathway surfaces.

10. Heat exchange apparatus in accordance with claim 6, comprising:
fluid distribution apparatus to provide fluid to said wettable surface.

11. Heat exchange apparatus in accordance with claim 10, comprising:
a reservoir for collecting condensate from gas flowing in said plurality of separate pathways, said fluid distribution apparatus utilizing said condensate as said fluid.

12. Apparatus for heat and mass exchange comprising:
a plurality of modules, each module comprising: a plurality of thermally conductive sheets, each sheet having a first wettable surface and a second moisture impervious surface, each said sheet having a corrugated portion comprising a plurality of corrugations;

said plurality of sheets being disposed in a stack such that each alternate sheet of said plurality of sheets has its corrugations affixed to and disposed at an angle to the corrugations of an adjacent sheet such that the corrugated portions provide a plurality of separate pathways, said plurality of sheets arranged such that said moisture impervious surface of each sheet faces said moisture impervious surface of the adjacent sheet and said wettable surface of each sheet faces said wettable surface of an adjacent sheet such that first predetermined ones of said pathways comprise moisture impervious surfaces and second predetermined ones of said pathways comprise wettable surfaces;

said stack of sheets having first end portions disposed to provide first inlets and first outlets for said first predetermined ones of said pathways and second end portions to provide second inlets and second outlets for said second predetermined ones of said pathways;

said first predetermined ones of said pathways adapted for a first gas flow and said second predetermined ones of said pathways adapted for a second gas flow, said first and second gas flows being countercurrent;

said corrugations providing heat transfer between said first and second gas flows such that a temperature change in one of said first and second gas flows causes heat transfer to the other of said first and second gas flows.

13. Apparatus in accordance with claim 12, comprising:
said corrugations are configured to cause a reduction in both laminar flow and boundary layer thickness of gases, flowing through each said module.

14. Heat exchange apparatus in accordance with claim 12, comprising:
a pathway configured such that a portion of gas flowing through said first predetermined ones of said pathways is channeled countercurrent through said second predetermined ones of said pathways.

15. Heat exchange apparatus in accordance with claim 12, comprising:
each sheet of said plurality of sheets comprising an edge portion usable to aid distribution of fluid when wetting said second predetermined pathway surfaces.

16. Heat exchange apparatus in accordance with claim 12, comprising:
fluid distribution apparatus to provide fluid to said wettable surface.

17. Heat exchange apparatus in accordance with claim 16, comprising:
a reservoir for collecting condensate from gas flowing in said plurality of separate pathways, said fluid distribution apparatus utilizing said condensate as said fluid.

18. Apparatus for heat and mass exchange comprising:
a plurality of modules, each module comprising:
a plurality of thermally conductive, moisture impervious sheets, each said sheet having a corrugated portion comprising a plurality of corrugations;

said plurality of sheets being disposed in a stack such that each alternate sheet of said plurality of sheets has its corrugations affixed to and disposed at an angle to the corrugations of an adjacent sheet such that the corrugated portions provide a plurality of separate flow pathways;

said plurality of separate flow pathways comprising first predetermined ones of said pathways and second predetermined ones of said pathways;

said stack of sheets having first end portions disposed to provide a first inlets and a first outlets for first predetermined ones of said pathways and second end portions to provide second inlets and second outlets for second predetermined ones of said pathways;

said corrugations forming said second predetermined ones of said pathways comprising a wettable surface;

said first predetermined ones of said pathways adapted for a first gas flow and said second predetermined ones of said pathways adapted for a second gas flow, said first and second gas flows being countercurrent; and said corrugations providing heat transfer between said first and second gas flows such that a temperature change in one of said first and second gas flows causes heat transfer to the other of said first and second gas flows.

19. Heat exchange apparatus in accordance with claim 18, comprising;
said corrugations forming said first predetermined ones of said pathways comprising a wettable surface.

20. Heat exchange apparatus in accordance with claim 19, comprising;
said corrugations forming said second predetermined ones of said pathways comprising a wettable surface.

21. Heat exchange apparatus in accordance with claim 20, comprising:
first fluid distribution apparatus to provide first wetting fluid to said first predetermined ones of said pathways.

22. Heat exchange apparatus in accordance with claim 21, comprising:
second fluid distribution apparatus to provide second wetting fluid to said second predetermined ones of said pathways.

23. Heat exchange apparatus in accordance with claim 22, comprising:
said first wetting fluid is a first composition provided to said first fluid distribution apparatus; and
said second wetting fluid is a second composition provided to said second fluid distribution apparatus, said first composition being different from said second composition.

24. Heat exchange apparatus in accordance with claim 22, comprising:
said first wetting fluid is water; and
said second wetting fluid is a liquid desiccant.

25. Heat exchange apparatus in accordance with claim 22, comprising:
said first wetting fluid is water; and
said second wetting fluid is a water alcohol solution.

26. Heat exchange apparatus in accordance with claim 18, comprising:
gas flows through one module of said plurality of modules are in the opposite direction of gas flows through a another module of said plurality of modules.

27. Heat exchange apparatus in accordance with claim 18, comprising:
a plurality of gas flows interact with said plurality of modules.

28. Heat exchange apparatus in accordance with claim 21, comprising:
a dehumidification stage in fluid communication with and disposed between a first module of said plurality of modules and a second module of said plurality of modules, said dehumidification stage receiving air exiting said first module and providing dehumidified air to said second module.

29. Heat exchange apparatus comprising:
a plurality of thermally conductive sheets, each said sheet having a corrugated portion comprising a plurality of corrugations;
said plurality of sheets being disposed in a stack such that each alternate sheet of said plurality of sheets has its corrugations affixed to and disposed at an angle to the corrugations of an adjacent sheet such that the corrugated portions provide a plurality of separate flow pathways;
said plurality of separate flow pathways comprising first predetermined pathways and second predetermined pathways;
said stack of sheets having first end portions disposed to provide a first inlets and a first outlets for first predetermined ones of said pathways and second end portions to provide second inlets and second outlets for second predetermined ones of said pathways;
said first predetermined pathways alternate with said second predetermined pathways, said first predetermined pathways being impermeable to the passage of moisture;
said first predetermined ones of said pathways adapted for a first gas flow and said second predetermined ones of said pathways adapted for a second gas flow, said first and second gas flows being countercurrent; and
said corrugations providing heat transfer between said first and second gas flows such that a temperature change in one of said first and second gas flows causes heat transfer to the other of said first and second gas flows.

30. Apparatus in accordance with claim 29, comprising:
said corrugations are configured to cause a reduction in both laminar flow and boundary layer thickness of gases, flowing through each said module.

* * * * *